United States Patent
Davis et al.

(10) Patent No.: US 7,346,234 B2
(45) Date of Patent: Mar. 18, 2008

(54) REDUCTION OF MEMS MIRROR EDGE DIFFRACTION IN A WAVELENGTH SELECTIVE SWITCH USING SERVO-BASED MULTI-AXES ROTATION

(75) Inventors: Joseph E. Davis, Morgan Hill, CA (US); Brian P. Tremaine, San Jose, CA (US)

(73) Assignee: Capella Photonics, San Jose, CA (US)

( * ) Notice: Subject to any disclaimer, the term of this patent is extended or adjusted under 35 U.S.C. 154(b) by 97 days.

(21) Appl. No.: 11/317,450

(22) Filed: Dec. 22, 2005

(65) Prior Publication Data

US 2006/0228071 A1    Oct. 12, 2006

Related U.S. Application Data

(63) Continuation-in-part of application No. 11/104,143, filed on Apr. 11, 2005.

(51) Int. Cl.
G02B 6/42    (2006.01)
(52) U.S. Cl. .................. 385/18; 385/15; 385/16; 385/17
(58) Field of Classification Search .......... 385/24, 385/37, 33–34, 15–18; 359/291
See application file for complete search history.

(56) References Cited

U.S. PATENT DOCUMENTS

| | | | |
|---|---|---|---|
| 5,629,790 A | 5/1997 | Neukermans et al. | 359/198 |
| 5,745,271 A | 4/1998 | Ford et al. | 398/87 |
| 5,835,458 A | 11/1998 | Bischel et al. | 369/44.12 |
| 5,868,480 A | 2/1999 | Zeinali | 353/31 |
| 5,960,133 A | 9/1999 | Tomlinson | 385/18 |
| 5,974,207 A | 10/1999 | Aksyuk et al. | 385/24 |
| 6,172,777 B1 | 1/2001 | Flood et al. | 359/10 |
| 6,193,376 B1 | 2/2001 | Hayashi et al. | 353/30 |
| 6,204,946 B1 | 3/2001 | Aksyuk et al. | 398/9 |
| 6,205,269 B1 | 3/2001 | Morton | 385/24 |
| 6,222,954 B1 | 4/2001 | Riza | 385/18 |
| 6,259,841 B1 | 7/2001 | Bhagavatula | 385/47 |
| 6,263,127 B1 | 7/2001 | Dragone et al. | 385/24 |
| 6,263,135 B1 | 7/2001 | Wade | 385/37 |
| 6,289,155 B1 | 9/2001 | Wade | 385/37 |

(Continued)

OTHER PUBLICATIONS

U.S. Appl. No. 11/104,143, to Joseph E. Davis and Mark H. Garrett, entitled "Optical Add-Drop Multiplexer Architecture With Reduced Effect of Mirror Edge Diffraction", filed Apr. 11, 2005.

(Continued)

Primary Examiner—Frank G. Font
Assistant Examiner—Guy G Anderson
(74) Attorney, Agent, or Firm—Joshua D. Isenberg; JDI Patent

(57) ABSTRACT

Effects of diffraction of a spectral beam from an edge of the micromirrors are reduced in order to optimize the passband in a wavelength selective switch. The effects of diffraction on the pass band may be reduced by using rotation of the micromirror about both the attenuation axis and the switching axis to achieve the desired level of attenuation. Peak coupling can be attained by dithering the micromirror about an axis tangent to a contour of constant attenuation using simultaneous rotation about the switching and attenuation axes.

23 Claims, 24 Drawing Sheets

U.S. PATENT DOCUMENTS

| | | | |
|---|---|---|---|
| 6,307,657 B1 | 10/2001 | Ford | 398/9 |
| 6,327,398 B1 | 12/2001 | Solgaard et al. | 385/18 |
| 6,343,862 B1 | 2/2002 | Sawai et al. | 353/1 |
| 6,345,133 B1 | 2/2002 | Morozov | 385/24 |
| 6,381,387 B1 | 4/2002 | Wendland, Jr. | 385/37 |
| 6,415,073 B1 | 7/2002 | Cappiello et al. | 385/24 |
| 6,418,250 B1 | 7/2002 | Corbosiero et al. | 385/24 |
| 6,439,728 B1 | 8/2002 | Copeland | 359/515 |
| 6,453,087 B2 | 9/2002 | Frish et al. | 385/24 |
| 6,549,699 B2 * | 4/2003 | Belser et al. | 385/24 |
| 6,625,346 B2 | 9/2003 | Wilde | 385/24 |
| 6,634,810 B1 | 10/2003 | Ford et al. | 398/88 |
| 6,647,172 B2 | 11/2003 | Giles et al. | 385/18 |
| 6,657,770 B2 | 12/2003 | Marom et al. | 359/290 |
| 6,661,393 B2 | 12/2003 | Tegreene et al. | 345/7 |
| 6,661,945 B2 | 12/2003 | Tedesco et al. | 385/24 |
| 6,661,948 B2 | 12/2003 | Wilde | 385/24 |
| 6,687,431 B2 | 2/2004 | Chen et al. | 385/24 |
| 6,695,457 B2 | 2/2004 | Drieenhuizen et al. | 359/872 |
| 6,704,476 B2 | 3/2004 | Ford et al. | 385/24 |
| 6,757,458 B2 | 6/2004 | Neilson et al. | 385/18 |
| 6,760,511 B2 | 7/2004 | Garrett et al. | 385/24 |
| 6,771,855 B2 | 8/2004 | Pezeshki et al. | 385/31 |
| 6,798,941 B2 | 9/2004 | Smith et al. | 385/18 |
| 6,820,988 B2 | 11/2004 | Drieenhuizen et al. | 359/872 |
| 6,845,195 B2 | 1/2005 | Tedesco | 385/37 |
| 6,958,861 B1 | 10/2005 | Argueta-Diaz | 359/618 |
| 6,975,785 B2 | 12/2005 | Ghandi et al. | 385/16 |
| 7,062,120 B2 | 6/2006 | Shiozaki et al. | 385/18 |
| 7,162,115 B2 * | 1/2007 | Brophy et al. | 385/16 |
| 7,236,660 B2 | 6/2007 | Ducellier | 385/24 |
| 2002/0176657 A1 | 11/2002 | Burke et al. | 385/18 |
| 2003/0095307 A1 | 5/2003 | Moon et al. | 398/45 |
| 2004/0160687 A1 | 8/2004 | Van Drieenhuizen et al. | 359/872 |
| 2004/0208468 A1 | 10/2004 | Sufleta et al. | 385/140 |
| 2005/0074204 A1 | 4/2005 | Wilson et al. | 385/24 |
| 2006/0093256 A1 | 5/2006 | Yamashita et al. | 385/18 |
| 2006/0093257 A1 | 5/2006 | Aota et al. | 385/18 |
| 2006/0140536 A1 | 6/2006 | Aota et al. | 385/18 |
| 2006/0245030 A1 * | 11/2006 | Pan | 359/291 |
| 2007/0166034 A1 | 7/2007 | Tremaine | 398/45 |

OTHER PUBLICATIONS

U.S. Appl. No. 11/469,394 to Joseph E. Davis et al., filed Aug. 31, 2006.

U.S. Appl. No. 11/840,182 to Mark H. Garrett, filed Aug. 16, 2007.

"The International Search Report" and "The Written Opinion of the International Searching Authority" for International application No. PCT/US2006/024075.

"The International Search Report" and "The Written Opinion of the International Searching Authority" for International application No. PCT/US2006/008639.

"The International Search Report" and "The Written Opinion of the International Searching Authority" for International application No. PCT/US2006/043169.

* cited by examiner

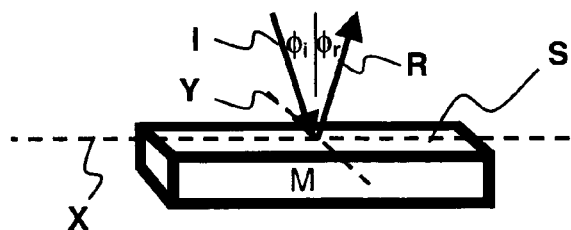
Figure 6A
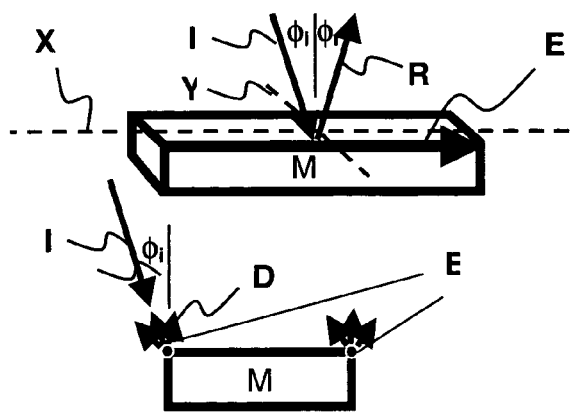
Figure 6B
Figure 6C
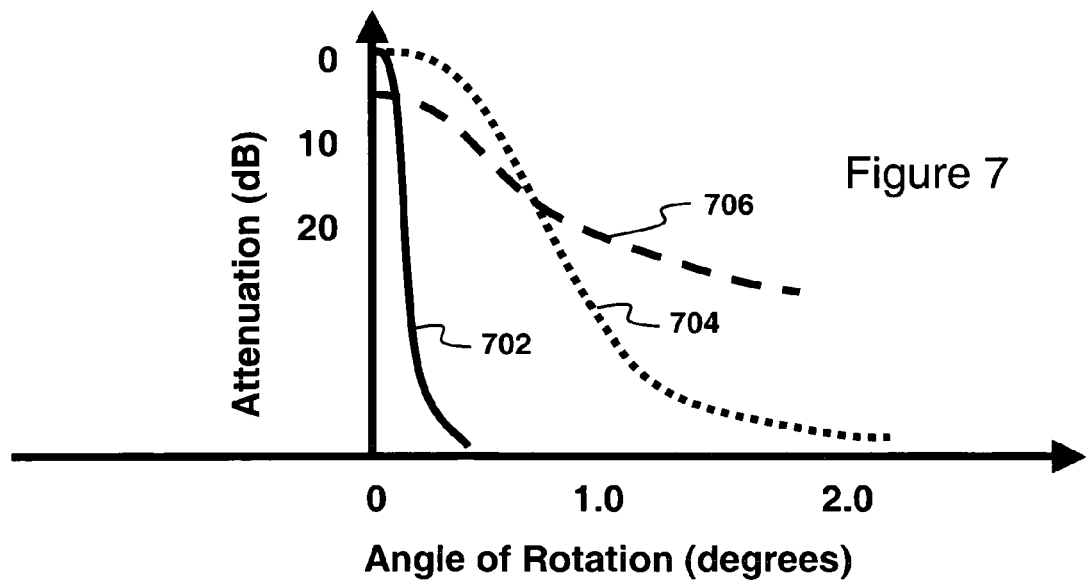
Figure 7

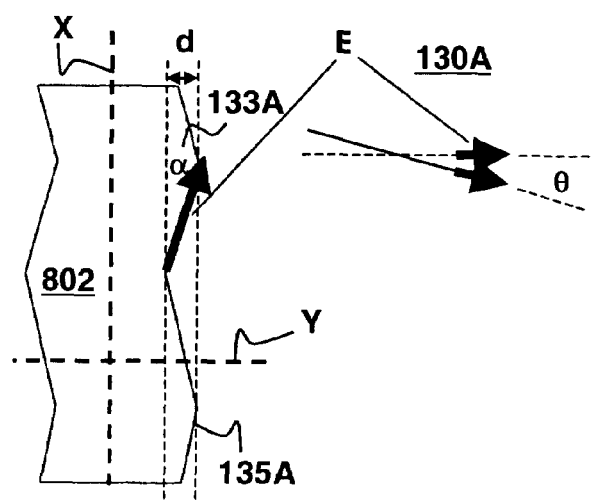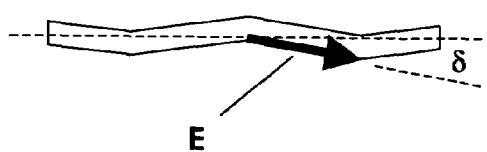
Figure 8A     Figure 8B     Figure 8C

REDUCTION OF MEMS MIRROR EDGE DIFFRACTION IN A WAVELENGTH SELECTIVE SWITCH USING SERVO-BASED MULTI-AXES ROTATION

CROSS REFERENCE TO A RELATED APPLICATION

This application is a continuation-in-part of and claims the benefit of priority of U.S. patent application Ser. No. 11/104,143, which was filed on Apr. 11, 2005, the entire disclosures of which are incorporated herein by reference.

BACKGROUND

This application relates generally to optical communications systems and methods for wavelength division multiplexed (WDM) optical networks, and more particularly to wavelength selective switch systems and methods having optimized optical performance for switching and managing the power of individual spectral channels of a multi-channel optical signal.

Multi-channel optical signals typically comprise a plurality of spectral channels, each having a distinct center wavelength and an associated bandwidth. The center wavelengths of adjacent channels are spaced at a predetermined wavelength or frequency interval, and the plurality of spectral channels may be wavelength division multiplexed to form a composite multi-channel signal of the optical network. Each spectral channel is capable of carrying separate and independent information. At various locations, or nodes, in the optical network, one or more spectral channels may be dropped from or added to the composite multi-channel optical signal, as by using, for example, a reconfigurable optical add-drop multiplexer (ROADM). Reconfigurable optical add-drop architectures are disclosed in commonly assigned U.S. Pat. Nos. 6,549,699, 6,625,346, 6,661,948, 6,687,431, and 6,760,511, the disclosures of which are incorporated by reference herein.

An optical switching node may comprise one or more wavelength selective switches (WSS) configured as ADD and/or DROP modules. The referenced patents disclose wavelength selective switch apparatus and methods comprising an array of fiber coupled collimators that serve as input and output ports for optical signals, a wavelength-separator such as a diffraction grating, a beam-focuser, and an array of channel micromirrors, one micromirror for each spectral channel. In operation, a composite multi-wavelength optical signal (also referred to herein as a "multi-channel optical signal") from an input port is supplied to the wavelength separator. The wavelength separator spatially separates or demultiplexes the free-space multi-wavelength optical signal into an angular spectrum of constituent spectral channels, and the beam-focuser focuses the spectral channels onto corresponding ones of the channel micromirrors. The channel micromirrors are positioned such that each channel micromirror receives an assigned one of the separated spectral channel beams. The micromirrors are individually controllable and continuously pivotable (or rotatable) so as to reflect the spectral channel beams into selected output ports. This enables each channel micromirror to direct its corresponding spectral channel into any possible output port and thereby switch the spectral channel to any desired output port. Each output port may receive none, one, or more than one of the reflected and so directed spectral channels. Spectral channels may be selectively dropped from a multi-channel signal by switching the channels to different output ports, and new input channels may be selectively added or combined with the original channels to form different multi-wavelength composite signals.

It is also desirable, for a number of reasons, to be able to monitor and control the power in individual spectral channels of the multi-wavelength optical signal. This includes the ability to completely block the power contained in a particular spectral channel. One reason for controlling the power in a channel is to afford "hitless" switching to minimize undesired crosstalk during repositioning of a channel micromirror to direct ("switch") an input spectral channel beam to a desired output port. During repositioning, the channel micromirror redirects the input spectral channel beam across, i.e., "hits", intermediate ports, which couples unwanted light into the intermediate ports, and causes crosstalk. Thus, it is desirable either to completely block or to substantially attenuate the power in the beam during switching so that unwanted light coupling is avoided. Another use of monitoring and controlling the optical power of a channel is to afford attenuation of that channel to some predetermined level.

The above-mentioned U.S. patents disclose one approach to power management and hitless switching that employs a spatial light modulator, such as a liquid crystal pixel array, to attenuate or completely block the power contained in the spectral channels. Each pixel in the liquid crystal array is associated with one of the spectral channels, and a separate focal plane is created at the location of the liquid crystal array such that a spectral spot corresponding to each channel is located on its associated pixel. Since the voltage applied to the pixel controls the light transmissivity of a pixel, the pixel can be made less transmissive or even opaque to the transmission of light by applying an appropriate voltage, thereby attenuating or completely blocking the power in the spectral channel passing through that pixel. However, this approach has the disadvantage of requiring additional components, including a relay lens system to create a focal plane at the liquid crystal array, the liquid crystal array itself, and electronics to control the liquid crystal array. In addition to the added costs for such additional components, more physical space is needed to accommodate these components, which increases the overall size and complexity of the system.

U.S. Pat. No. 6,549,699 discloses another approach to power management of spectral channels in which the rotation of a channel micromirror about its switching axis (the axis of the parallel to the array of channel micromirrors) is controlled to vary the spatial location of the reflected spectral channel beam relative to its intended output port. Since the amount of power in a spectral channel that is coupled to an output port is a function of the coupling efficiency, a desired power level can be obtained by pivoting the channel micromirror a predetermined angle to decouple the optical beam relative to the output port to attenuate it by an amount corresponding to the desired output power level.

A disadvantage of this latter approach is that decoupling the spectral channel beam spatially repositions the beam along the switching axis. Depending upon the physical spacing of adjacent output ports, a portion of the beam may be cross-coupled into an adjacent output port, causing detrimental cross-talk between the ports. Increasing the physical spacing of the ports to decrease the cross-coupling undesirably increases the physical size of the device. Furthermore, as will be described in detail later, using this approach it is difficult to accurately control the power output levels of spectral channels due to the sensitivity of the coupling to rotation of the channel mirror about the switching axis. To overcome this, wavelength selective switches have been developed that utilize rotation of a channel micromirror about a separate axis (herein referred to as the attenuation axis) to vary the power of a selected beam. However, this approach can lead to a non-uniform attenuation of the passband in the form of side lobes herein referred to as "rabbit ears". It would be desirable to have a wavelength selective switch that is able to achieve accurate attenuation of separate channels without these passband non-uniformities.

It is to these ends that embodiments of the present invention are directed.

SUMMARY OF THE INVENTION

Embodiments of the invention find application to optimizing a passband in optical switches that switch components of multi-channel optical signals characterized by spectral channels of different wavelengths between input and output ports. The optical signals are converted from one or more input ports into spectral beams. The spectral beams are spatially separated into constituent spectral channels. The separated spectral channels are focused onto corresponding channel micromirrors that switch the focused spectral channels to one or more selected output ports. Each micromirror is positioned to receive one of the spectral channels. Each micromirror is rotatable about a switching axis to switch the spectral channel to a selected output port. Each micromirror is also rotatable about an attenuation axis to vary the coupling of the switched spectral channel to the selected output port to control a power level of the spectral channel output at such selected port.

The effects of diffraction of a spectral beam from an edge of the micromirrors are reduced in order to optimize the passband and reduce the increased power levels between the passbands. This increased power level between passbands can cause undesirable effects on the behavior of broadband amplifiers. The diffraction may be reduced by using rotation of the micromirror about both the attenuation axis and the switching axis to achieve the desired level of attenuation. Peak coupling can be attained by dithering the micromirror about an axis tangent to a contour of constant attenuation using simultaneous rotation about the switching and attenuation axes.

Other more specific aspects of the invention will be set out in the description and claims that follow.

BRIEF DESCRIPTION OF THE DRAWINGS

FIGS. 6A-6C are three-dimensional schematic diagrams illustrating diffraction of light from the surface and edges of a micromirror.

FIG. 7 is a graph showing attenuation curves for light reflecting from different parts of a mirror illustrating the dependence of attenuation on where light strikes the mirror and whether the mirror rotates about the switching axis or the attenuation axis.

FIGS. 8A-8H are schematic diagrams of micromirrors configured to reduce the effect of edge scattering according to an embodiment of the present invention.

INTRODUCTION

For reasons discussed below, it appears that diffraction from the edge of the mirror is the source of the side lobes known as "rabbit ears" during attenuation. Without being limited to any particular theory, it is believed that the spatial passband non-uniformities induced by the diffraction are directed into the output port during attenuation. Changing the edge of the mirror or making a pattern on the edge can alter the direction and amplitude of the passband non-uniformity induced by diffraction. Furthermore, in WSS systems that use a grating to separate a signal into constituent optical channels, the grating may have an efficiency versus angle of incidence such that it can filter or reduce the passband non-uniformity. Passband non-uniformities induced by an edge modification of the mirror can also be directed out of the system clear aperture. Passband non-uniformities may also be eliminated by appropriately configuring the acceptance angle of an output fiber. Passband non-uniformities may also be eliminated by a spatial filtering system. Passband non-uniformities may also be reduced or eliminated by rotating the mirror about its switching axis either solely or in combination with rotation of the mirror about its attenuation axis.

In view of the above, the side lobes in the optical passband may be reduced by 1) modification of the edge profile of the channel mirror; 2) efficiency filtering by appropriate selection of the Bragg width of the grating; 3) spatial filtering at a Fourier transform plane; 4) rotating the mirror solely about the switching axis or in combination with rotation about its attenuation axis or some combination of these.

DESCRIPTION OF PREFERRED EMBODIMENTS

Embodiments of the present invention are particularly applicable to wavelength selective switches (WSS) as used, for example, in reconfigurable optical add-drop multiplexers (ROADMs) permitting dynamic network reconfiguration and enabling management of the power or attenuation of individual spectral channels of a multi-wavelength (multi-channel) optical signal, such that signals can be readily added to or dropped from the network. One or more components of such switches are configured to reduce passband non-uniformities due to diffraction at edges of micromirrors used to switch optical signals from one port to another. It will become apparent, however, that this is illustrative of only one utility of the invention.

Figure 1:
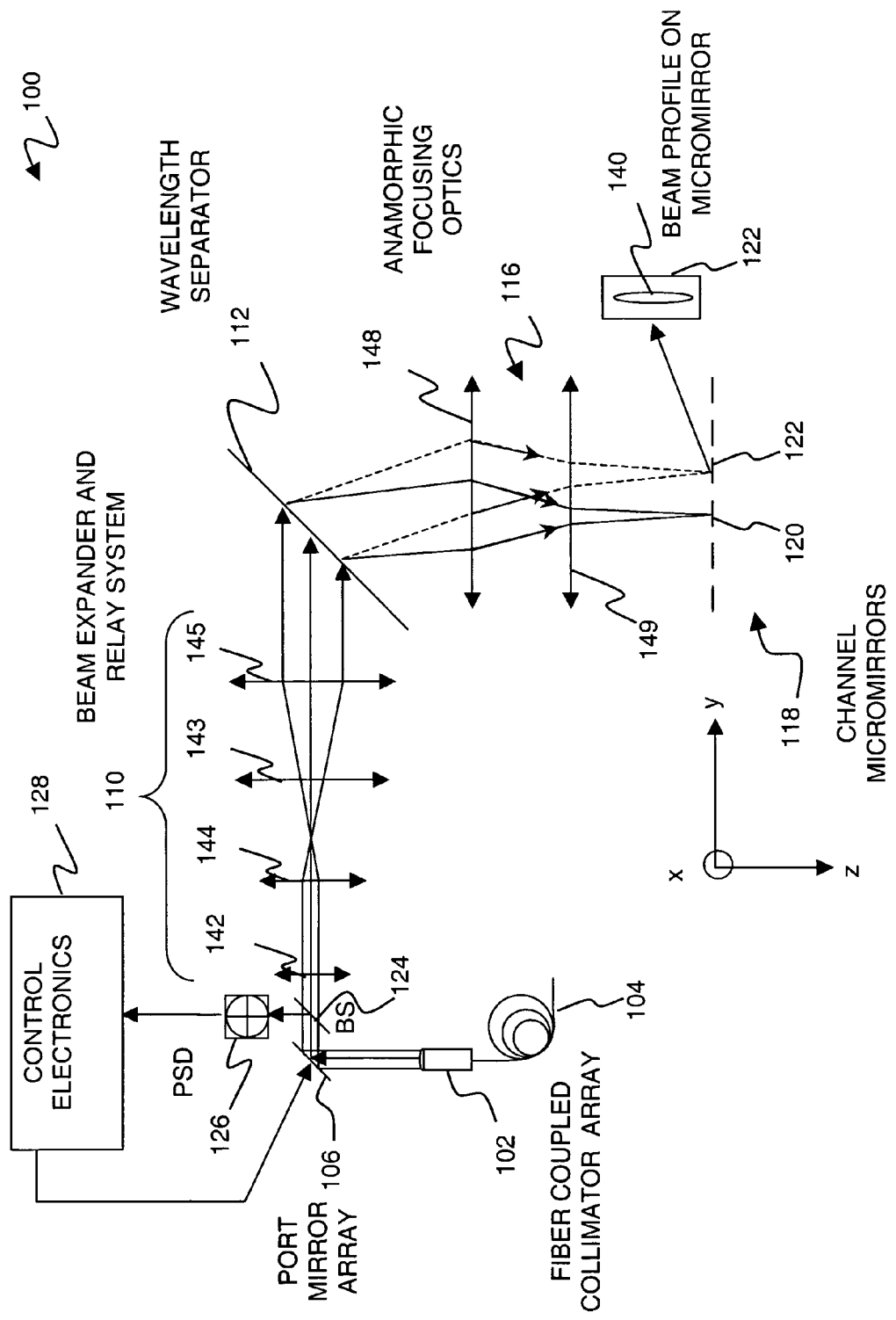
FIG. 1 is a diagrammatic view illustrating the architecture of a wavelength selective switch (WSS) in accordance with an embodiment of the invention, which may be employed in an ADD or DROP module of a ROADM.

FIG. 1 is a diagrammatic view that illustrates the architecture of a portion of a wavelength selective switch 100 in accordance with an embodiment of the invention. One or more wavelength selective switches having an architecture as shown in the figure and configured as ADD or DROP modules, may be combined in a ROADM at a node of a wavelength division multiplexed (WDM) optical network, for example. As shown, WSS 100 may comprise a fiber collimator array 102 which provides a plurality of input and output ports for optical signals that are input to and output from the WSS by a plurality of optical fibers 104. The input and output ports may include an express port. The express port refers to the port for which most of the light is transmitted through the WSS. Fiber collimator array 102 may comprise a plurality of individual fiber coupled collimators, one connected to each optical fiber as shown and will be described in more detail, for example, in connection with FIGS. 10A, 10B, 10C, 11 and 12. WSS 100 may further comprise a port mirror array 106 comprising an array of port mirrors, such as MEMS micromirrors, (as shown, for example, in FIG. 2), an optical beam expander and relay system 110, a wavelength separator 112 which is preferably a diffraction grating, beam focusing optics 116 and an array of channel micromirrors 118, optically arranged as illustrated in FIG. 1. Components of the WSS such as the collimator array 102, the port mirror array 106, the beam expander and relay system 110, the beam focusing optics 116 and the channel micromirrors 118 may be configured to reduce the detrimental effects of diffraction at the edges of the micromirrors as described below.

By way of example and without limiting the scope of the invention, the wavelength separator 112 may be of any of several types of free-space beam separators that are commercially available. Preferably, the wavelength separator 112 is a diffraction grating although embodiments of the invention are not limited to such gratings. Suitable types of diffraction gratings include but are not limited to reflection, such as high spatial frequency gratings holographically formed, low spatial frequency gratings such as an Echelle grating, which is a ruled grating, and transmission gratings which can be holographically formed in various polymers. Although a diffraction grating is preferred, other wavelength separators, e.g., planar light circuits, may alternatively be used instead of a diffraction grating as the wavelength separator 112.

A composite multi-wavelength optical signal comprising a plurality of spectral channels may be supplied to an input port of the fiber collimator array 102 and reflected and aligned by a corresponding port mirror of the port mirror array 106 through the beam expander and relay system 110 onto the diffraction grating 112. For reasons to be explained, in accordance with certain embodiments of the invention, the beam expander and relay system 110 may be an anamorphic system, e.g., lenses that provide different magnifications along orthogonal axes. The diffraction grating 112 angularly separates the constituent spectral channels of the multi-wavelength optical signal, and the telecentric focusing optics 116, which in this example is also an anamorphic system, focuses the individual spectral channels into spectral spots onto corresponding ones of the channel micromirrors of array 118. Two such channels having center wavelengths $\lambda_i$ and $\lambda_j$ are shown in the figure being focused onto corresponding channel micromirrors 120, 122, respectively. The channel micromirrors are arranged spatially in the array in accordance with the spatial separation of the spectral channels of the composite multi-wavelength optical signal induced by the diffraction grating and the focusing optics such that each channel micromirror receives one of the spectral channels. Spectral channels are reflected from the micromirrors back through the optical system to the fiber collimator array. The channel micromirrors are individually controllable, as will be described, such that upon reflection a spectral channel may be directed, i.e., switched, into a desired output port of the fiber collimator array with a desired coupling efficiency or attenuation.

Each output port may receive and output any number of the reflected spectral channels. Accordingly, spectral channels may be selectively dropped from the composite multi-channel signal by switching the channels to one or more "drop" output ports, and the multi-channel signal containing the remaining channels may be output from a "pass-through" port. Moreover, new input channels may be selectively added or combined at an output port with a subset of the original spectral channels to form a different multi-channel composite signal. Both WSS DROP modules that drop channels from and WSS ADD modules that insert or add channels to the multi-channel optical signal may employ a similar architecture to that shown in FIG. 1, as will be described.

Generally, there may be a separate channel micromirror in array 118 for each spectral channel. A typical multi-channel WDM optical signal may have 45 or 96 spectral channels, for example. Accordingly, array 118 of FIG. 1 may comprise 45 or 96 channel micromirrors. The channel micromirrors preferably comprise silicon micromachined mirrors (MEMS mirrors), and each micromirror is preferably a biaxial device, which is capable of independent continuous rotational movement about two orthogonal axes. As will be explained in more detail shortly, this enables a channel micromirror to be pivoted about a first axis to reflect a corresponding spectral channel to a selected output port, and pivoted about the orthogonal axis to control the amount of power coupled to that output port.

The WSS of FIG. 1 may further comprise a beam splitter 124 disposed in the optical path between the port mirror array and the anamorphic beam expander and relay system 110, a position sensitive detector (PSD) 126 that receives a light beam reflected from the beam splitter, and associated control electronics 128 responsive to signals from the PSD for controlling the mirrors of the port mirror array 106. As will be described in more detail, this arrangement enables alignment of the beams from the port mirrors onto the center of the channel micromirrors, which contributes to optimizing the passband and maintaining ITU grid alignment.

Figure 2:
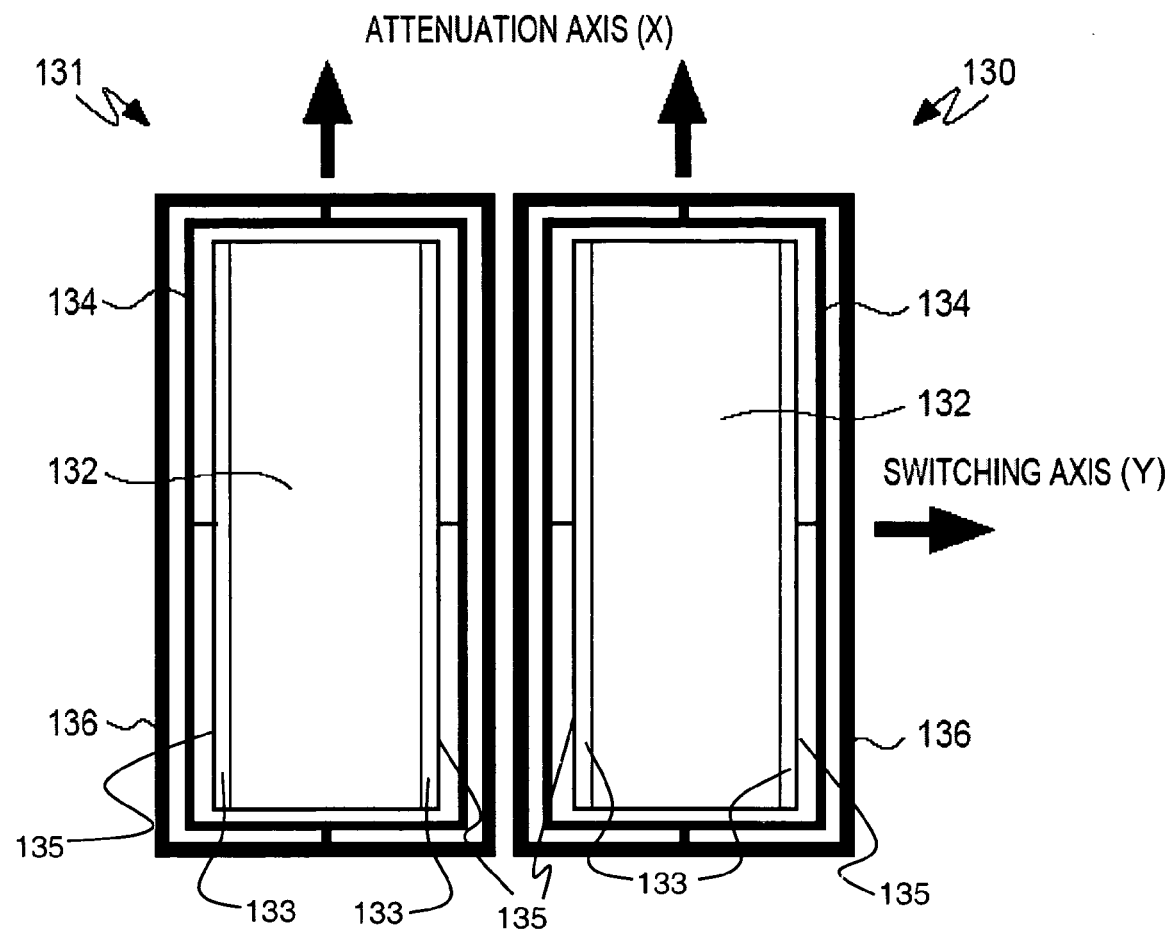
FIG. 2 illustrates a pair of adjacent biaxial channel micromirrors of a micromirror array that may be employed in the wavelength selective switch of FIG. 1.

FIG. 2 illustrates a typical construction of a biaxial channel micromirror in accordance with embodiments of the invention. The figure shows only a pair of adjacent biaxial MEMS channel micromirrors 130, 131 of the plurality of micromirrors of array 118. As suggested by the figure, the remaining micromirrors of the array extend horizontally (in the figure) along the switching axis X with substantially the same lateral spacing between micromirrors. All micromirrors of the array may have the same construction. Each channel micromirror may compromise an assembly of a planar reflective surface 132 pivotally supported on an inner gimbaled frame 134 for rotation about a horizontal (in FIG. 2) "switching" axis Y. Gimbaled frame 134 may be pivotally supported on an outer frame 136 for rotation about an orthogonal "attenuation" axis X. The pivoting movement of the reflective mirror surface 132 about the orthogonal axes may be continuously variable and actuated electrostatically by applying voltages to opposing pairs of control electrodes (not shown) in a well known manner. The planar reflective surface may also be placed on a pedestal above the plane of the gimbaled frames in order to achieve a higher fill factor (that is, reduce the spacing between the edges of the planar reflective surfaces of adjacent mirrors. Each channel micromirror has one or more edge regions 133 that are substantially parallel to the attenuation axis X. By substantially parallel it is meant that the edge region 133 is oriented on average more or less parallel to the attenuation axis X. On a local level, however, the boundary or terminus 135 of the edge need not necessarily be always oriented parallel to the attenuation axis. As will become clear in subsequent discussions, diffraction of light at the edge regions 133 can have dramatic effects on the attenuation of light as a function of its wavelength.

As shown in FIG. 2, the reflective mirror surface 132 of the channel micromirrors may have an elongated, preferably rectangular, shape and be oriented with their narrow dimension, e.g., width, along the horizontal switching axis Y, and with their long dimension, e.g., length, along the vertical attenuation axis X. There are a number of reasons for this particular micromirror profile and orientation relative to the orthogonal axes. This design affords optimum mechanical performance by affording micromirrors of low mass, high resonant frequency, and low aerodynamic interaction, and optimizes optical performance such as high passband, and affords accurate control of attenuation, as will be explained. Referring back to FIG. 1, the switching axis Y of the channel micromirrors of array 118 is parallel to the horizontal plane of FIG. 1, while the attenuation axis X extends into the plane of the figure. This is also indicated schematically in FIG. 1 by the illustration of the beam profile 140 on micromirror 122. It is desirable that the profile of the spectral channel beams being focused onto the micromirrors also be elongated and oriented to conform generally to the shape and size of the micromirror. Preferably, the beams have a generally elliptical shape, as shown. Moreover, it is desirable to control the spot size and location of a channel beam focused upon a corresponding micromirror relative to the micromirror size to minimize unwanted power loss and to maximize the passband.

The collimated input beam from the fiber collimator array 102 generally has a circular cross-section. Accordingly, to provide a controlled beam shape and size on the micromirror, the beam expander and relay system 110 is made anamorphic, i.e., providing different magnifications in the X and Y directions. As indicated in FIG. 1, the anamorphic beam expander and relay system 110 may comprise a series of lenses 142-145, including lenses 142 and 143 having focal lengths $f_x$ and $f'_x$ and lenses 144 and 145 having focal lengths $f_y$ and $f'_y$. The lenses may be bi-conical, cylindrical or toroidal lenses, or other elements that afford a system having anamorphic characteristics. In a preferred embodiment of the invention diffraction grating 112 is preferably a transmission grating selected to have high diffraction efficiency and low polarization dependent loss with little or no anamorphic beam expansion.

From the diffraction grating 112, beams corresponding to the separated individual spectral channels are focused on to channel micromirrors by focusing optics 116, which also is preferably anamorphic. As shown, the focusing optics may comprise lens systems 148 and 149 having focal lengths $F_x$ $F_y$ and $F'_x$ $F'y$, respectively. The anamorphic beam focusing optics changes the beam profile spot size and orientation from the diffraction grating to the optimum size and appropriate orientation as indicated by beam profile 140 on the channel micromirror. The channel beams are reflected back through the optical system to the fiber collimator array, and the anamorphic optics determines their characteristics at the output ports. After the channel micromirror design has been determined, the optical characteristics of the anamorphic beam expander and relay system 110 and anamorphic focusing optics 116 may be selected to provide spectral channel beams having the predetermined size, shape and characteristics at the channel micromirrors as well as at the output ports. As will be described, optimum optical performance is afforded in large part by designing the optical system to optimize the beam profile and alignment on the micromirrors.

Figure 3A:
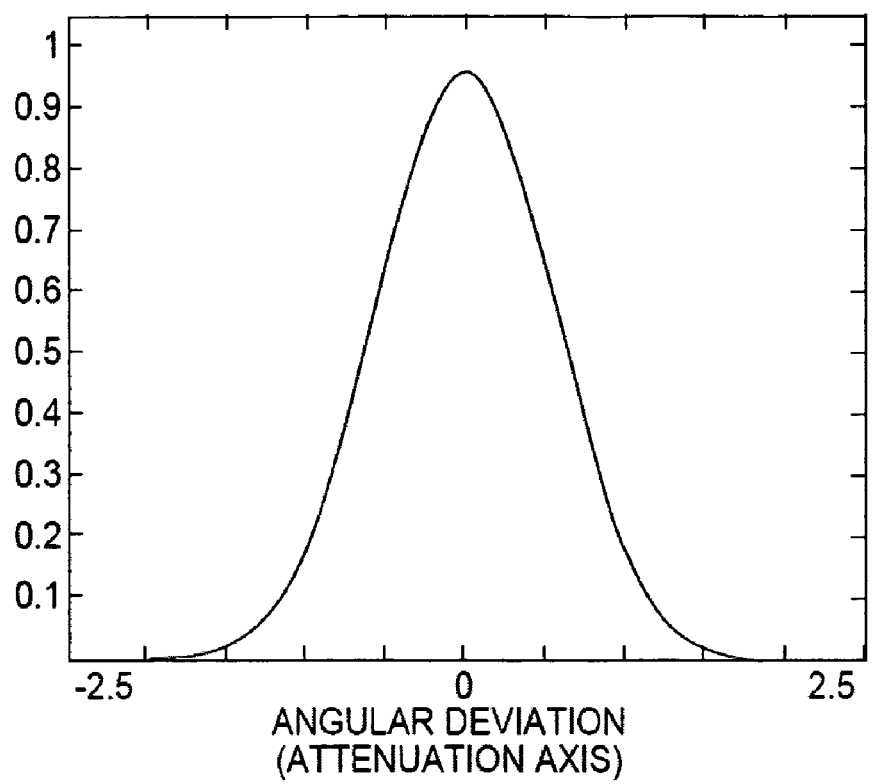
FIG. 3 A-B are representative curves showing differences in coupling efficiency as a function of rotation about orthogonal attenuation and switching axes of the biaxial channel micromirrors of FIG. 2.

The architecture described herein is significant in affording a simplified and effective approach to managing the power in individual spectral channels that avoids the difficulties and disadvantages associated with previously known approaches to power management, while enabling optical performance to be optimized. In embodiments of the invention, rotating a channel micromirror about its attenuation axis reduces coupling efficiency for the corresponding spectral channel and causes the amount of light coupled into the output port to be reduced. As the amount of rotation of the channel micromirror about the attenuation axis increases, the coupling continuously decreases until light is no longer coupled to the output port. FIG. 3A is a curve that is representative of the variation in coupling as a function of the angle of rotation of a channel micromirror about its attenuation axis X. As the channel micromirror rotates either positively or negatively from an angle of zero degrees, corresponding to a maximum coupling condition, the coupling rapidly decreases so that at an angle of approximately plus or minus 2.5 degrees, substantially no light is coupled into the output fiber.

Figure 3B:
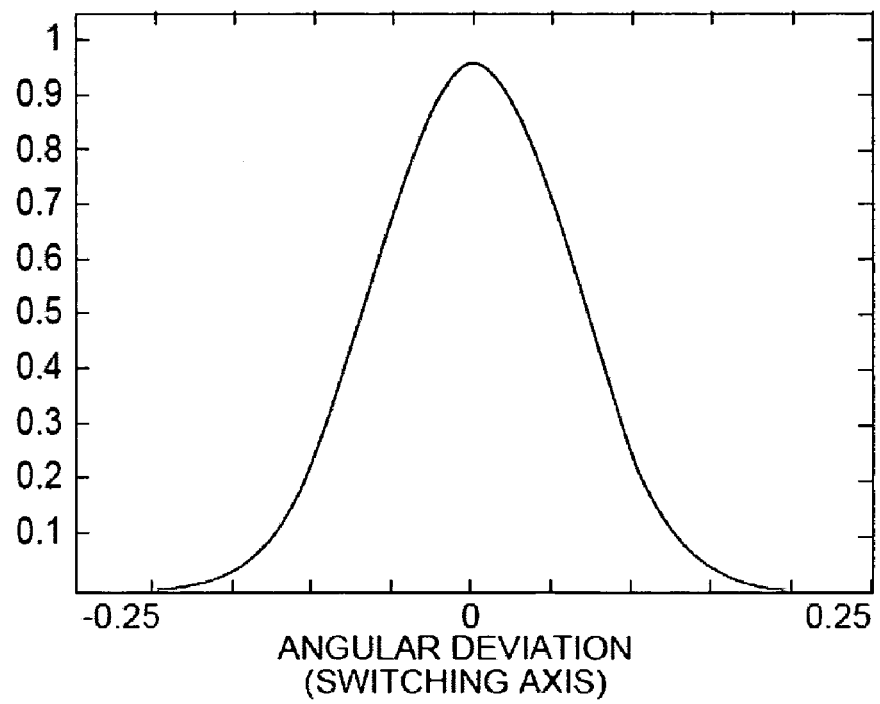

FIG. 3B is a similar representative coupling curve for rotation of the channel micromirror about its switching axis Y. As shown, for the particular micromirror design illustrated in the two curves, the coupling efficiency as a function of angular rotation of the channel micromirror about its switching axis is approximately ten times more sensitive than the coupling efficiency for rotation of the channel mirror about its attenuation axis. For a MEMS channel micromirror having reasonable size and mechanical characteristics and for an optical system designed to afford optimum optical performance in the wavelength range of interest, e.g., 1550 nm, the coupling efficiency for rotation of a channel micromirror about the switching axis Y may be as shown in the curve of FIG. 3B. However, the high sensitivity of coupling efficiency to angular rotation about the switching axis Y for this micromirror, as shown in the curve of FIG. 3B, makes it difficult to accurately and stably control power level using this axis, particularly under adverse environmental conditions such as shock, vibration, temperature variations and aging of components. Rather, desensitizing the coupling efficiency to that shown in FIG. 3A for the attenuation axis X permits more stable and accurate control of power level over the range of normal operating conditions. For an elongated mirror profile such as shown in FIG. 2, the coupling efficiency of light reflected from the channel micromirrors is determined principally by the anamorphic beam expander and relay system 110 (WSS) of FIG. 1, as will now be explained.

Since the fiber is conjugate to the channel micromirror, rotation of the channel micromirror produces an angular deviation of the beam at the fiber and, accordingly, a coupling change. Thus, the rotation of the channel micromirror produces an angular deviation of the beam at the fiber and, thus, a coupling change. For an anamorphic system, with different focal lengths $f_x$, and $f_y$ along orthogonal X and Y axes, respectively, the angular deviations of the beam at the fiber will, therefore, be different for rotation about the orthogonal axes. Angular rotations $\Delta\theta_x$ and $\Delta\theta_y$ of the channel micromirror create displacements $\Delta x$ and $\Delta y$ of the beam of $\Delta\theta_x f_x=\Delta x$, and $\Delta\theta_y f_y=\Delta y$ at the entrance aperture of the focusing optics. These displacements are relayed onto the output port collimator by the anamorphic beam expander, which, when operating in the reverse direction, causes demagnification of the displacements inversely proportional to magnification factors Mx and My. The output port collimator focuses the light onto the output fiber with the angular deviations $\Delta\theta_{xcoll}=(\Delta x/Mx)/f_{coll}$, and $\Delta\theta_{ycoll}=(\Delta y/My)/f_{coll}$. Typically $f_x$ and $f_y$ may differ by 10%, but Mx and My can differ by a factor of 10 or more. Since the displacements are different, the angles of the beam in the orthogonal axis directions onto the output fiber will be different. This produces different angular sensitivities for the orthogonal rotation axis of the channel micromirrors, as shown in FIGS. 3A and 3B. Accordingly, by selecting the magnification factors of the anamorphic optics appropriately, a decrease in angular sensitivity for the attenuation axis relative to the orthogonal switching axis can be obtained that affords accurate control of attenuation and equalization of the power and stable operation.

Figure 4:
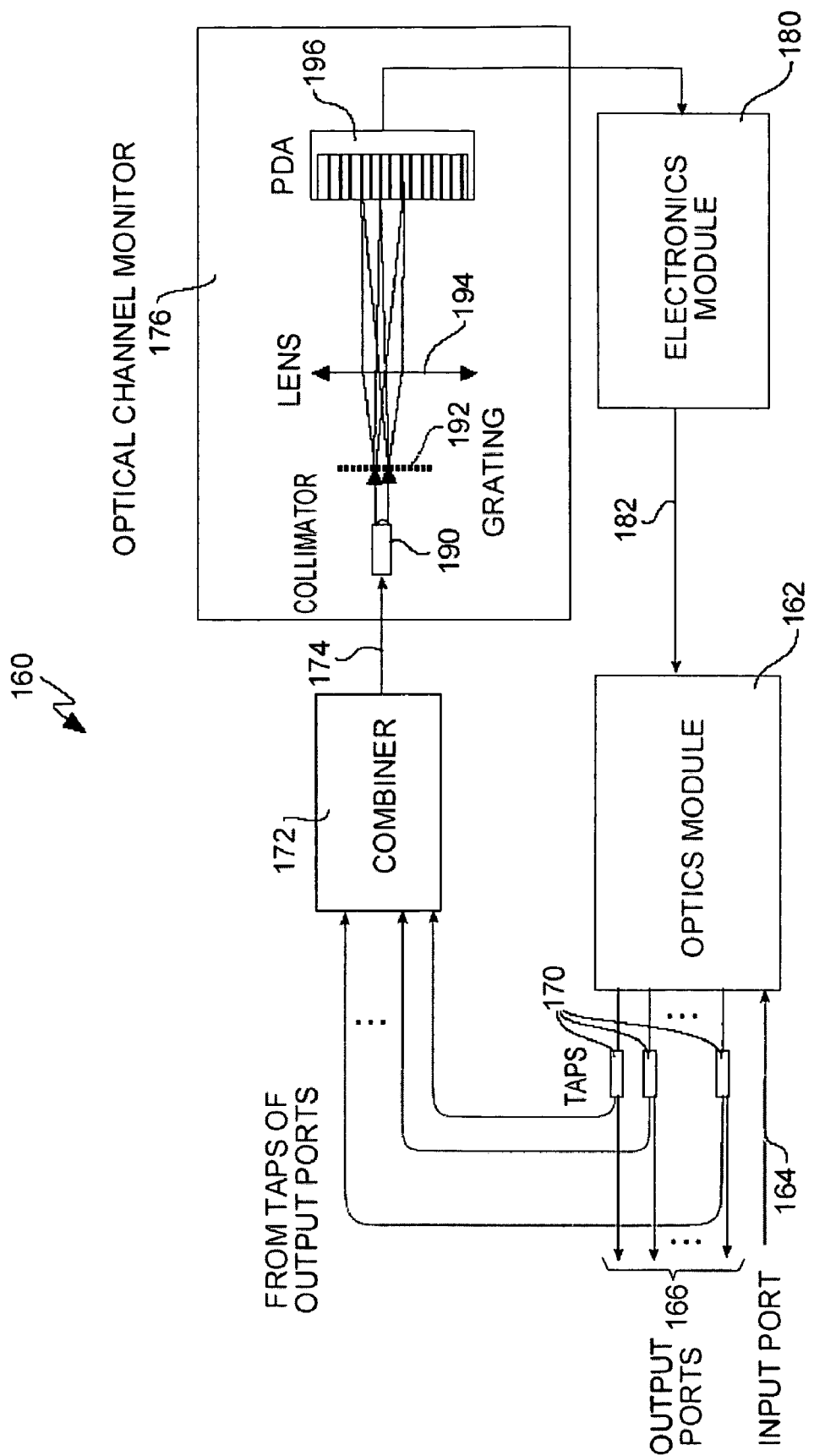
FIG. 4 is a diagrammatic view of a servo control system that may be employed for controlling the rotation of the channel micromirrors about their switching and attenuation axes for managing power level and coupling efficiency of spectral channels of a multi-channel optical signal reflected from the micromirrors.

In order to optimize the coupling of the spectral channels into output ports and to control accurately the power level of each spectral channel, embodiments of the invention may employ a servo-based feedback control system to control the axes of the channel micromirrors. The same control system preferably may, but need not necessarily, be used to control both orthogonal axes of both the channel micromirror and the port mirrors of the port mirror array. FIG. 4 illustrates an embodiment of a feedback control system 160 in accordance with an embodiment of the invention that may be used for controlling both axes of both types of MEMS mirror arrays. In the figure, optical module 162 may comprise substantially the optical system of the wavelength selective switch WSS 100 shown in FIG. 1. The optical module may comprise a DROP module having an input port 164 for receiving an input composite multi-channel optical signal, and having a plurality of output pass-through or drop ports 166 for output of either spectral channels or other multi-channel optical signals. Each output port may have a fiber optic coupler (or tap) 170, which samples a portion, e.g., 2%, of the power of the optical signal output on the port. The samples of the optical signals output from the ports may be combined in an optical combiner 172 to form a composite multi-channel signal output onto a fiber 174. The composite multi-channel optical signal may be supplied to an optical channel monitor (OCM) 176, which detects and measures the optical power in each spectral channel and provides this information to an electronics module 180. The electronics module may use the power measurements to generate appropriate electrostatic control signals, which are fed back to the optical module at 182 for controlling the movement of the channel micromirrors about their attenuation and switching axes as well as the port mirrors about their X and Y axes.

As shown in FIG. 4, the optical channel monitor 176 may comprise a collimator 190 which receives the composite multi-channel optical signal from the optical combiner, a diffraction grating 192 which spatially separates the multi-channel optical signal into its constituent spectral channels, and a lens system 194 which images the spatially separated spectral channels onto optical sensors, such as a photodiode array (PDA) 196, that detects the optical power levels in each of the spectral components. PDA 196 may comprise, for example, a conventional 1×256 or a 1×512 array of photodiodes spatially arranged such that each of the spectral channels is imaged by the lens system onto a different set of a predetermined number of the photodiodes. The output voltages of the set of photodiodes associated with each spectral channel are supplied to the electronics module 180 and provide a measure of the optical power in that channel. The electronics module may comprise electronic components such as microprocessors, memory and signal processing programs, in firmware, for example, for processing the optical power measurements from the PDA and for generating the appropriate control signals to control the channel micromirrors and port mirrors in optical module 162.

The feedback control system 160 of FIG. 4 may control the rotation of the channel micromirrors 118 and the port mirrors 106 about their respective attenuation axes and manage the power levels of the optical signals coupled to the output ports. The effect of rotation about the port mirror attenuation axis is to simultaneously control the power level of all spectral channels being directed at the output port associated with a particular port mirror. The effect of rotation about the channel micromirror attenuation axis is to control the power level of an individual spectral channel. The control system 160 may be used to maintain a preset power level for the optical signal at each output port. The memory in the electronics module may contain tables of stored calibrated values that correspond to different power levels. The voltages output from the PDA 196 of the optical channel monitor 176 to the electronics module 180 representing the power level in each channel may be compared to set points entered into the electronics module corresponding to desired channel power levels. The electronics module may use the power measurements and the set points to generate appropriate electrostatic voltages to the electrodes of the channel micromirrors and port mirrors associated with the attenuation axes of the respective mirrors. This varies the coupling of a spectral channel signal to its output port and, accordingly, the attenuation applied to the signal to vary the output power at the port. The feedback loop of the control system 160 compares the power measurements from the PDA for the channel with the power level set point, and may control the electrostatic voltages applied to the attenuation electrodes of the associated channel micromirror and port mirror to drive the micromirror and port mirror to a coupling that attains the desired power level.

The control system 160 may also continue to monitor the output power level of each channel during operation, and may continuously adjust the voltages applied to the channel micromirror and port mirror electrodes to maintain a desired attenuation and power level. By using the coupling efficiency curve for the attenuation axis X which is desensitized relative to the switching axis Y, as shown in FIG. 3A, the feedback control system is able to accurately and stably maintain a preset power output level for each channel, even under adverse conditions caused by shock and vibration and variations in temperature. Moreover, as will be described shortly, the control system enables preset power levels to be set and maintained on a channel-by-channel basis over wide ranges.

In addition to controlling the movement of the channel micromirrors about their attenuation axes, the control system 160 of FIG. 4 may also control rotation of the channel micromirrors about their switching axes Y. The electronics module 180 may use the optical power measurements from the optical channel monitor 176 to provide feedback control to the switching axis of channel micromirrors, on an individual basis, to maintain optimal channel coupling. This enables optimum passband to be maintained.

Preferably, the control system of FIG. 4 employs an alternating or "dither" control signal approach for controlling the rotational position of the channel micromirrors about the switching axis to achieve and maintain optimal coupling from the input to the output. Since there is no interaction between the channel micromirrors, they are independent and may be controlled simultaneously by the processing electronics in the electronics module 180 to optimize the coupling of each. One axis of each channel micromirror may be dithered with a cosine waveform while the orthogonal axis is dithered with a sine waveform of the same dither frequency. The optical channel monitor can detect and measure the dither in a particular wavelength channel and the output power for the channel to determine the micromirror voltages for maximum coupling. These voltages may be saved in the memory, such as flash memory, in the electronics module as open-loop target voltages for each port of the system. When it is desired to switch a spectral channel from one port to another, the voltages stored in the flash memory for the destination port may be used for initially positioning the corresponding spectral channel micromirror at that port. When this open loop switching is complete, the feedback loop may be again enabled and the dither tones used to find the optimal peak coupling of the channel to that port. Achieving optimal coupling is important for minimizing the insertion loss of each channel as well as the cross-talk between adjacent channels.

The control system of FIG. 4 preferably controls the attenuation and switching axes of the channel micromirrors independently and alternately. After switching a channel from one port to another and optimizing the coupling using the dither tones as just described, the control system may then switch control modes to a straight voltage feedback loop, for example, to control the attenuation axis of the channel micromirror for a desired power level, as described above. The control system preferably does not use a dither approach to control the attenuation axis of the micromirrors because dither amplitude increases as the rotation of the mirror moves away from optimal coupling, which can produce instability.

The dither frequencies are preferably low frequency tones in the range, for example, from about 100 Hz to approximately 250 Hz, and preferably have amplitude sufficient to produce a small variation in optical power of the order of 0.5% (0.02 dB), for example. When the coupling of a channel is not optimal, the light will be modulated at the same frequency as the dither tone. When optimal coupling is achieved, however, the light will be modulated at twice the dither tone frequency. The processing electronics of the electronics module 180 may synchronously demodulate the amplitude variations on the channel power level signals produced by the optical channel monitor. When a tone of the dither frequency is present, the electronics may produce a dc control voltage to the switching axis electrodes to move the channel micromirror to the point of optimal coupling at which the signal from the optical channel monitor contains only modulation at twice the dither frequency.

The electronics module of the control system of FIG. 4 may embody control programs and algorithms that alternately and periodically control the switching axis of a channel micromirror for optimal coupling and the attenuation axis of the channel micromirror to maintain a desired power level. The control system preferably does not control both axes simultaneously but has the capability to control both axes simultaneously. As will also be described shortly, the electronics module may employ algorithms, which afford notchless operation, complete blocking of individual channels, and hitless switching. Prior to describing these concepts, an explanation will first be given with reference to FIG. 5 of the manner in which the power of individual spectral channels may be managed in accordance with embodiments of the invention.

Figure 5:
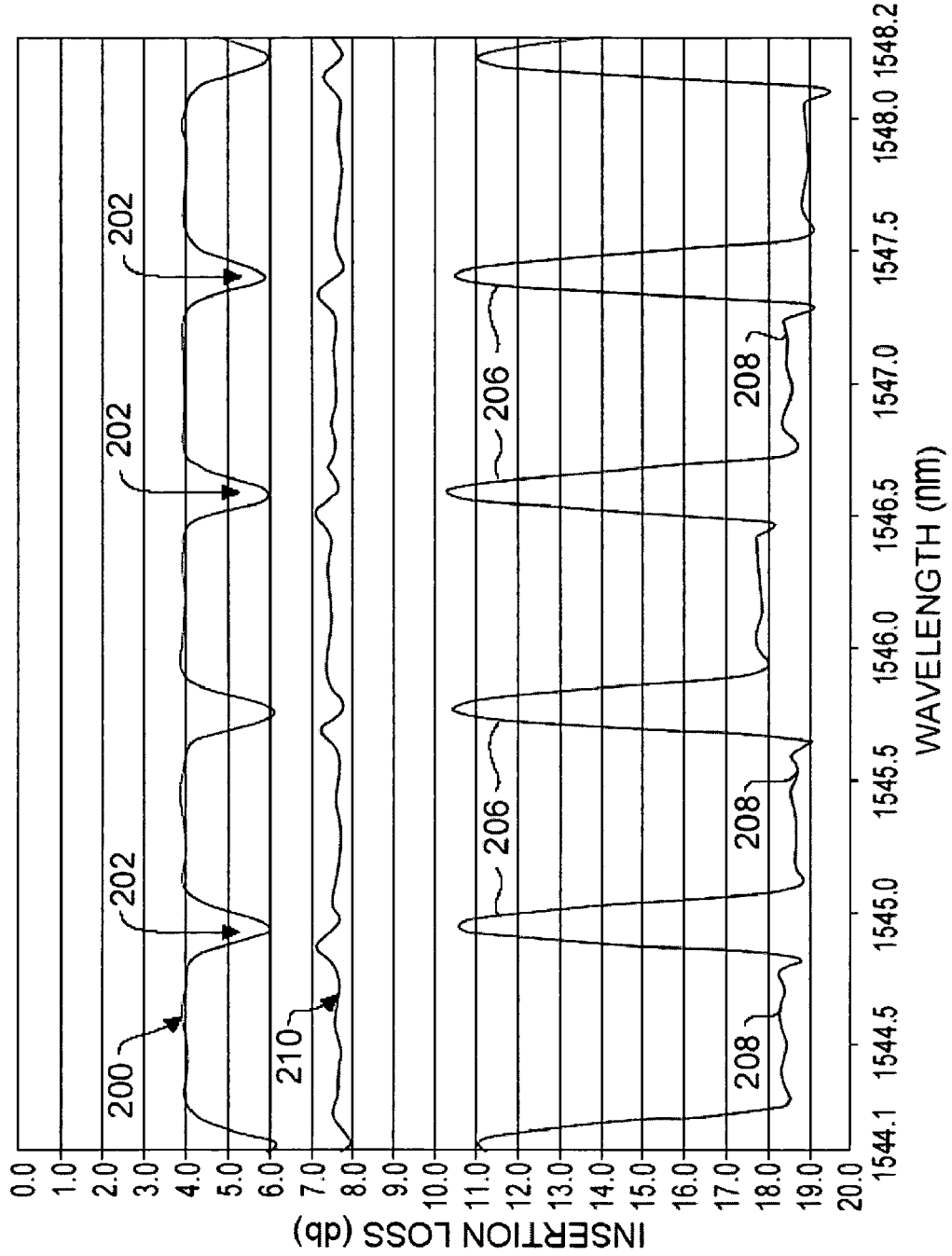
FIG. 5 shows plots of power level (represented as insertion loss) as a function of wavelength over the wavelength region of several adjacent channel micromirrors, the figure illustrating control of channel power to afford notchless operation.

As discussed above, diffraction of light at the micromirror edge can introduce anomalies in the attenuation of optical signals as a function of their wavelengths. FIG. 5 illustrates on the same plot three different curves that represent the power reflected from adjacent channel micromirrors over a wavelength region in the 1550 nm wavelength band corresponding to five adjacent spectral channels for different levels of attenuation (insertion loss). The curves may be generated using a broadband laser, for instance. The top curve 200 represents the reflected power from the five channel micromirrors for optimal coupling and zero dB attenuation. As shown, the reflected power is substantially constant at a level corresponding to approximately 4.0 dB insertion loss over a relatively wide wavelength region of each channel micromirror. This is referred to as the passband region, and corresponds approximately to 75% of the width of the channel micromirrors in the direction of the switching axis Y. Curve 200 also shows a region 202 between each channel micromirror where there is a reduction in reflected power level. This region is referred to as the "notch" region. As shown in FIG. 5, the power in the notch region may be down approximately 2.0 dB from the power level corresponding to 0 dB attenuation at the center of the channel micromirror. This is because the edges of the micromirrors are a source of diffraction from which the reflected power is less dependent on the angle of rotation of the micromirror, and, therefore, does not diminish with increased angular rotation in the same way reflected power diminishes from the flat mirror surface in the passband region. This is further illustrated by curves 206, 208, which show that by attenuating the power level by a relatively large amount (approximately 14 dB in the figure) the notch region transmits more power than the passband region. This notch region power is indicated by the peaks 206 in the figure which are at an insertion loss level of approximately 11.0 dB. The power represented by the peaks 206 is due to diffraction from the edges of the micromirrors. The power level in the passband region 208 between the peaks is at approximately 18.0 dB.

As set forth above, the peaks 206 (sometimes referred to as "rabbit ears") can present problems when optical signals switched by the wavelength selective switch 100 are transmitted over an optical communications network. Specifically, optical communication networks often utilize optical amplifiers to compensate for signal losses encountered as optical signals pass through various components of the network. Such optical amplifiers are often broadband in nature, i.e., they amplify optical signals over a broad band of wavelengths more or less indiscriminately. Due to the "rabbit ear" effect as exhibited by the peaks 206, noise near the edges of the pass band can be amplified to a much greater extent than signal from the central portion of the passband. Such high signal intensity can damage components of the network and degrade the signal-to-noise ratio throughout the network. The problem is exacerbated when wavelength selective switches are cascaded.

The "rabbit ear" effect is less pronounced when the power level is attenuated by a relatively small amount. For example, the middle curve 210 in FIG. 5 indicates that for an attenuation of about 4.0 dB, corresponding to an insertion loss of approximately 8.0 dB, the power level in the notch regions corresponds approximately to the power levels in the passband regions. This creates a near "notchless" operating condition in which the power level is substantially constant over the entire wavelength region corresponding to the adjacent micromirrors. This is particularly advantageous because it enables the transmission of arbitrarily spaced wavelengths that do not need to conform to any specific ITU grid spacing. Thus, the same set of channel micromirrors can be used for transmitting wavelengths on a 50, 100 or 200 GHz ITU grid spacing, as well as on wavelength bands that are common in coarse wavelength division multiplexing systems. Notchless operation also advantageously helps optimize passband and achieve the ITU specification for channel-to-channel power variation.

As is evident from FIG. 5, the power level transmitted by any particular spectral channel may be individually controlled by controlling the amount of attenuation applied to that channel. Complete blocking of the light of a spectral channel may be accomplished by rotating the corresponding channel micromirror about its attenuation axis by an amount needed to achieve the desired extinction ratio. This is particularly useful, for example, for "hitless" channel switching where the power in a spectral channel reflected from a micromirror undergoing switching rotation may be either completely blocked or reduced to a low level as the channel beam is switched from one port to another. Hitless switching avoids or minimizes the coupling of unwanted light to intermediate ports and undesirable cross-talk during switching. However, where a large degree of attenuation is required, the "rabbit ear phenomena due to diffraction at the micromirror edges 133 can still cause serious problems as described above. Embodiments of the present invention address the rabbit ear phenomena.

The edge diffraction effect exhibited as illustrated in FIG. 5 can be understood if certain assumptions are made. These assumptions are intended to explain the nature of the problem and are not meant as a limitation upon any embodiments of the invention. First, as depicted in FIG. 6A, it is assumed that for light incident on a flat smooth surface the angle of reflection $\phi_r$ is equal to the angle of incidence $\phi_i$. Second, as depicted in FIG. 6B, it is assumed that for light incident at the terminus of edge the angle of reflection $\phi_r$ is equal to the angle of incidence $\phi_i$ only if the plane of incidence is along a direction parallel to the terminus. Third, as depicted in FIG. 6C, it is assumed that light diffracts at the terminus in a plane perpendicular to the direction of the terminus and that the angle of reflection is distributed about the angle of incidence.

Given the above assumptions one can explain the observed "rabbit ear behavior" depicted in FIG. 5. Due to the plane wave behavior, light intensity attenuates rapidly on the mirror surface and along the edge for relatively small angles of rotation about the switching axis as indicated by solid attenuation curve 702 in FIG. 7. For example, a rotation of about 0.1 degree about the switching axis is sufficient to cause several dB of attenuation. When a beam is incident on a mirror surface, it also tends to attenuate relatively rapidly when the mirror rotates about the attenuation axis, though less rapidly compared to rotation about the switching axis as indicated by the dotted attenuation curve 704 in FIG. 7. When light is incident on the mirror surface in the vicinity of the edge parallel to the attenuation axis, rotation of the mirror about the attenuation axis tends to attenuate the signal intensity significantly less rapidly as indicated by the dashed attenuation curve 706 in FIG. 7.

It is noted that the "rabbit ear" peaks are often observed to be asymmetrical, i.e., one peak is higher than the other. The asymmetry usually depends on whether the mirror is rotated clockwise or counterclockwise with respect to the attenuation axis. This asymmetry is believed to be due to a slightly larger area of diffraction from the edge parallel to the attenuation axis that has been rotated slightly towards the beam. The other edge that is rotated slightly away from the beam also has a slightly smaller area of diffraction facing the beam.

The edge diffraction effect can be reduced in a number of different ways. For example, according to certain embodiments of the present invention, attenuation may be effected by a combination of rotation about the attenuation axis and rotation about the switching axis of either or both the channel mirror array and the port mirror array. Since rotation about the switching axis strongly attenuates the beam and is relatively insensitive to edge diffraction, the two rotations can be combined in a way that reduces or even eliminates the detrimental effects of edge diffraction and the associated "rabbit ear" phenomena.

According to embodiments of the present invention, the diffraction may be reduced by appropriately configuring the edge region 133 of the micromirrors 130 used in the micromirror channel array 118. One possible configuration, among others involves creation of a geometry that causes the effect of an edge rotation about the switching axis when the mirror is rotated about the attenuation axis. For example, FIGS. 8A-8C respectively depict top, end and side views of an example of a micromirror 130A having sawtooth edge 133A. The edge 133A is characterized by a sawtooth width d and a sawtooth angle α. On average, the edge 133A is parallel to the attenuation axis even though locally the terminus 135A may not be. However, the sawtooth shape gives the edge 133A a terminus 135A with an edge vector E having a component directed parallel to the switching axis Y as shown in FIGS. 8A and 8B. Thus, when the mirror 130A rotates about the attenuation axis by an angle θ the edge vector E experiences the equivalent of a rotation about the switching axis by an angle δ as illustrated in FIG. 8C. The angle δ is related to α and θ as follows:

$$\delta = \cos^{-1}((\sin^2\alpha)(\cos\theta - 1) + 1)$$

this may alternatively be written as $$\alpha = \sin^{-1}\{sqrt[(\cos\delta - 1)/(\cos\theta - 1)]\},$$

where sqrt represents the operation of taking the square root of the quantity in square brackets.

Thus, the sawtooth edge 133A produces the equivalent of a combination of a rotation about the switching axis with a rotation about the attenuation axis. The sawtooth angle may be between about 5 degrees and about 85 degrees. The inventors have determined experimentally that a combination of rotations about the switching axis and attenuation axis that is equivalent to a sawtooth angle α of between about 6 degrees and about 15 degrees is sufficient to significantly reduce the effect of rabbit ears. These measurements were made on a rectangular mirror approximately 500 microns in height and approximately 100 microns wide. The rotations about the switching and attenuation axes were approximately 0.15 and 0.7 degrees, respectively.

Figure 8D:
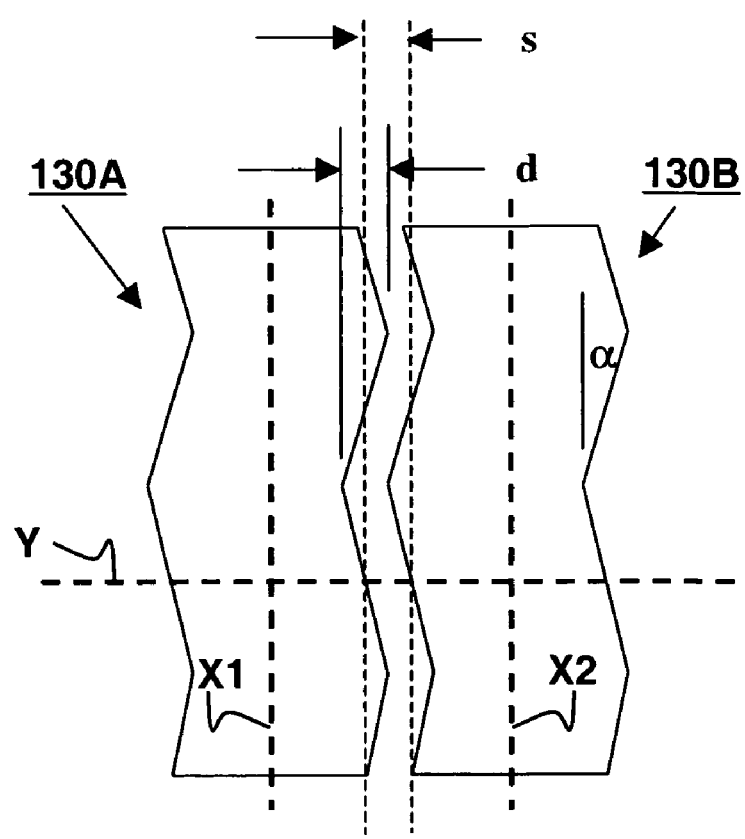

By way of example, two or more such mirrors 130A, 130B may be arrayed together as depicted in FIG. 8D. Adjacent micromirrors 130A, 130B may have conforming sawtooth edges that are separated by a suitable spacing, e.g., 6 microns although a greater or lesser spacing may be used. The mirrors 130A, 130B may rotate about a commonly defined switching axis Y and individually defined attenuation axes X1 and X2.

Figure 8E:
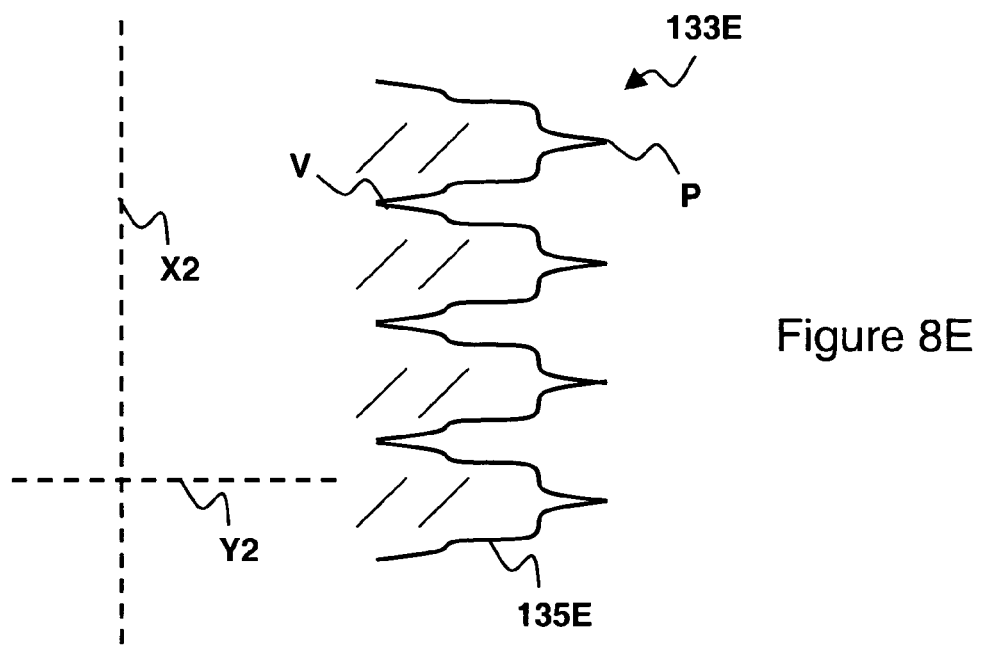

There are many variations on the configuration depicted in FIGS. 8A-8D. Specifically, the angle α, the number of sawtooth indentations into the edge 133A, the shape of the sawtooth indentations may all be varied. Consequently, embodiments of the invention are not limited to the particular sawtooth configurations illustrated in FIG. 8A. For example, as shown in FIG. 8E, a micromirror may have an edge 133E substantially parallel to the attenuation axis X2. The edge has a terminus 135E characterized by a number of sharp peaks P and valleys V where a substantial portion of the path length of the terminus 135E is directed along the switching axis Y2.

Figure 8F:
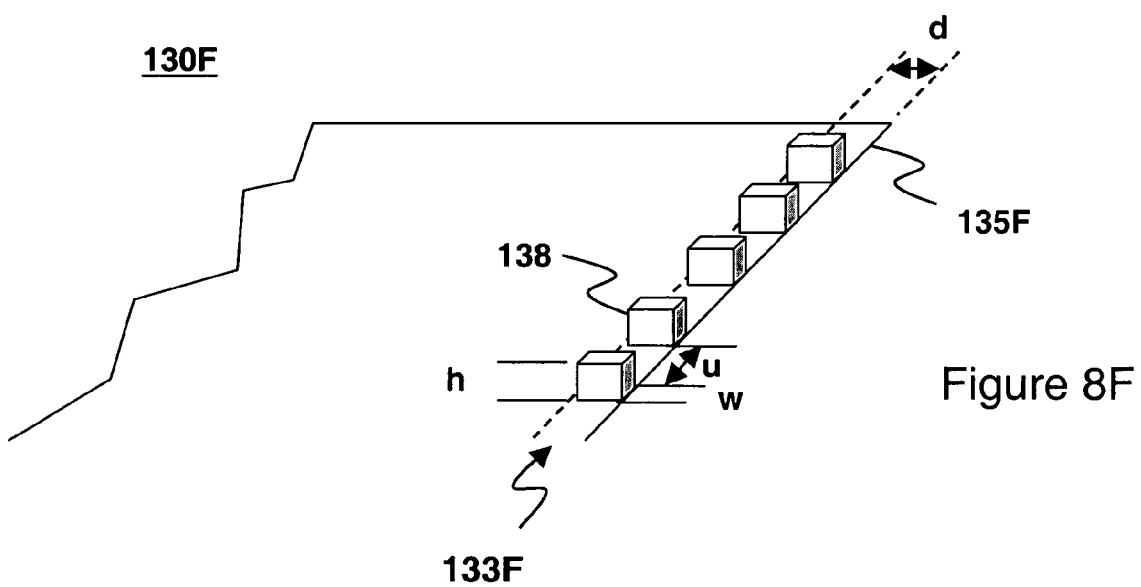

In another alternative embodiment depicted in FIG. 8F a micromirror may have an edge 133F with three-dimensional projections 138 spaced along the edge proximate to terminus 135F. The projections 138 may each be characterized by a depth d from the terminus 135F, a height h, and a width w. Adjacent projections may be spaced a distance u apart. The projections may be sized and shaped in such a way as to produce interference between optical wavefronts reflecting from the projections and wavefronts reflecting from the spaces between the projections such that the different light reflections at the edge 133F tend to cancel each other out. By way of example, the height h may be chosen to be roughly equal to a quarter wavelength of the light reflecting from the mirror 130F. Thus light reflecting from the spaces between the projections 133F travels an extra distance of half a wavelength compared to light reflecting from the projections 138. The half wavelength difference can produce destructive interference between light waves reflecting from the projections 138 and spaces between the projections 138. It is obvious that the three-dimensional projections 138 can instead be applied in the opposite manner; that is, as indentations below the surrounding surface rather than projections above it. It is also clear that in the limit where u=0 in FIG. 8F, the projections (or indentations) combine to form a continuous strip of height (or depth) h and width d.

Figure 8G:
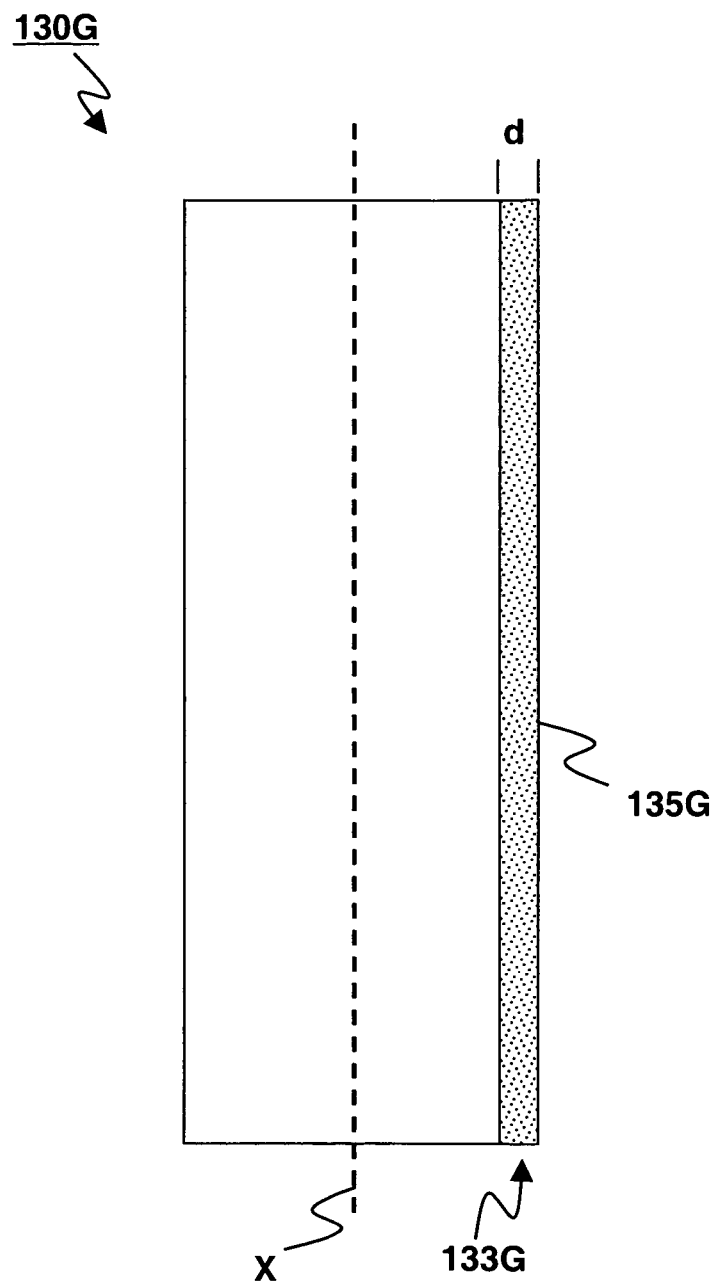

There are other ways of reducing edge diffractions. For example, FIG. 8G depicts a variation on the preceding embodiment. In this embodiment, a micromirror 130G has an edge 133G characterized by a variable reflectivity. The reflectivity at the edge 133G decreases towards a terminus 135G. The majority of the surface of the micromirror 130G has a high reflectivity. The reflectivity is less at the terminus 135G than at regions of the edge 133G further from the terminus. It is also possible to reduce diffraction at an edge increasing the solid angle of scatterers, e.g., by rounding the profile of the edge thereby giving the edge a larger radius of curvature.

Figure 8H:
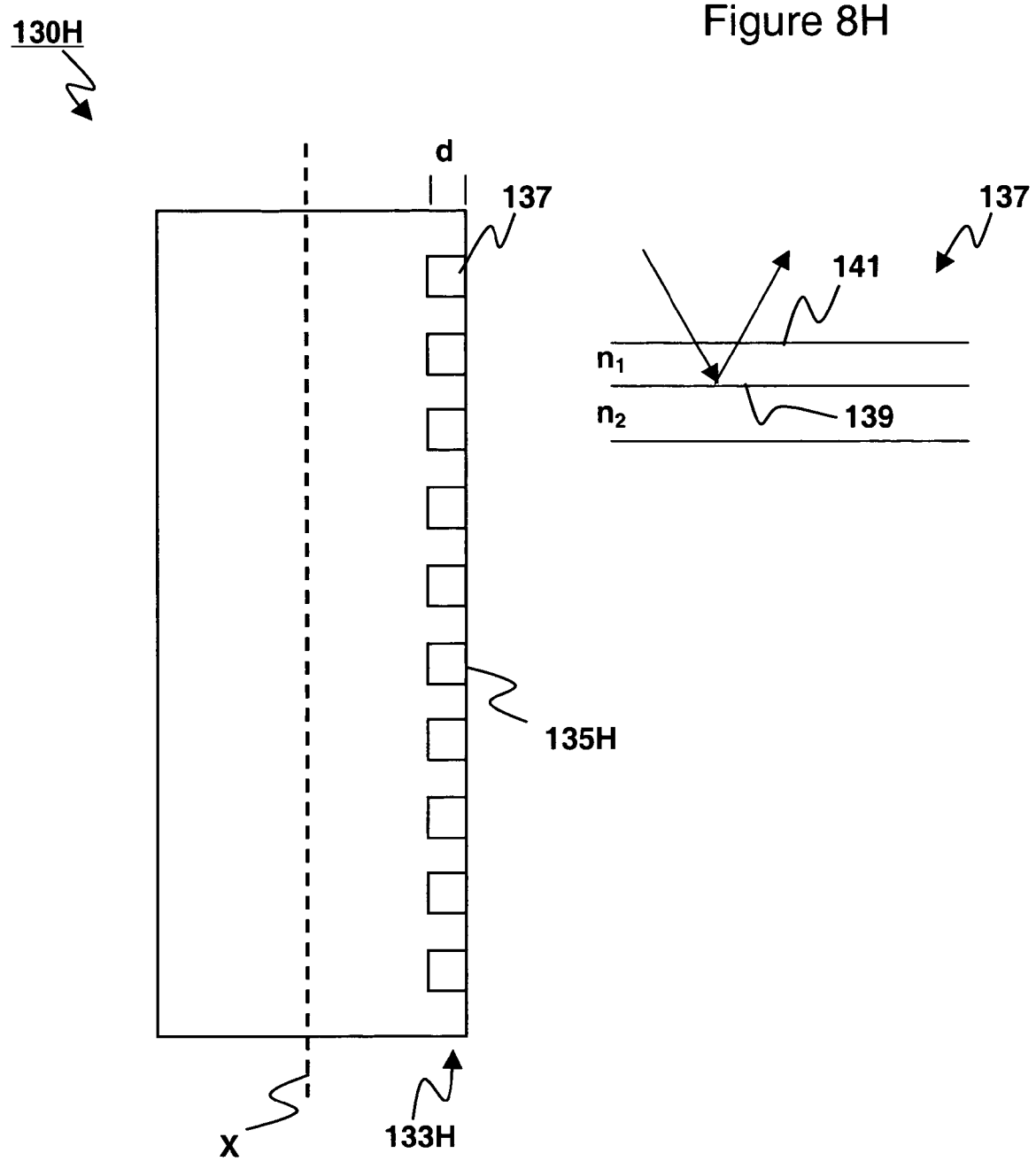

In yet another variation on the embodiment of FIG. 8F, destructive interference of light diffracting from the edge can be accomplished with a phase mask. As shown in FIG. 8H, a micromirror 130H can have a phase mask made up of one or more multi-layer regions 137 disposed along the edge 133H proximate a terminus 135H. As shown in the inset in FIG. 8H each multi-layer region 137 includes two or more layers, e.g., upper and lower layers respectively characterized by different refractive indexes $n_1$, $n_2$. Light reflecting from an interface 139 between the two layers may undergo a phase change upon reflection depending on the values of $n_1$ and $n_2$. If $n_1$ is less than $n_2$ light will undergo a 180 degree phase change upon reflection. If $n_1$ is greater than $n_2$ light will undergo no phase change upon reflection. Light also reflects from a top interface 141 between the upper layer $n_1$ and the surrounding medium of index $n_3$ (e.g., air or vacuum) and may undergo a phase change depending on $n_3$. If $n_1 > n_2$ and $n_1 > n_3$ light reflecting from the upper interface 141 undergoes a 180 degree change of phase upon reflection while light reflecting from the interface 139 undergoes no phase change on reflection. If the thickness of the upper layer is sufficiently small compared to the wavelength of the light the two phase changes tend to cause cancellation of light reflecting from the edge 133H.

Figure 9A:
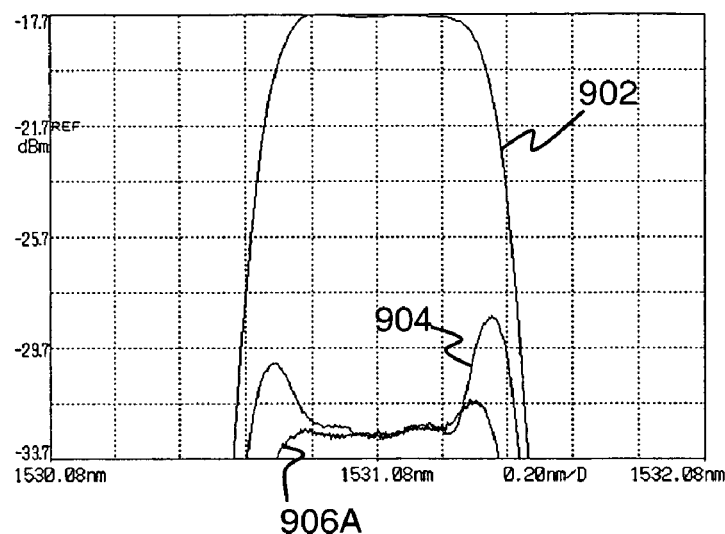
FIGS. 9A-9C are graphs of attenuation versus wavelength illustrating reduction of edge diffraction effects according to an embodiment of the present invention.
Figure 9B:
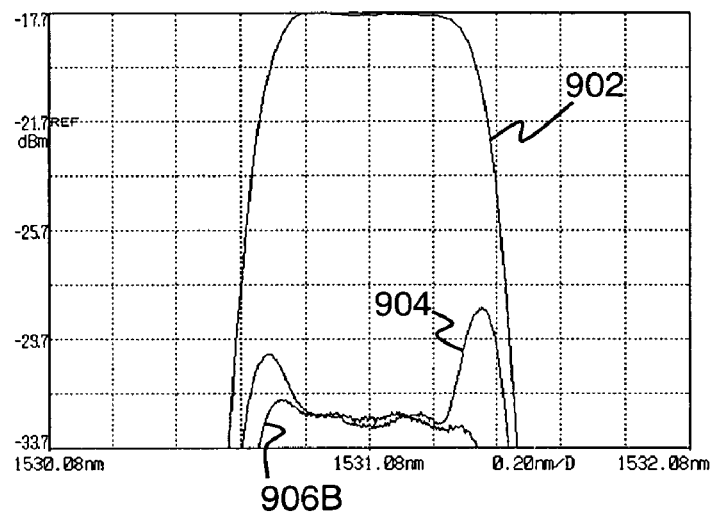
Figure 9C:
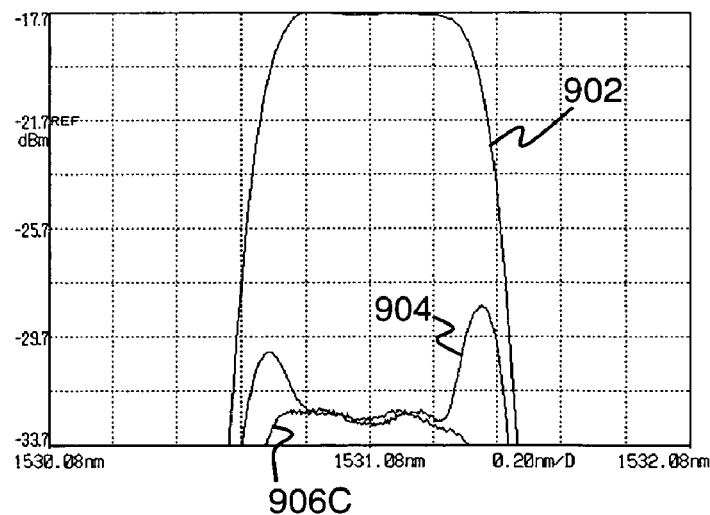

In addition to configuring the edge 133 of the micromirrors 130, there are other ways of reducing the effect of diffraction at the edge. For example, it is possible to perform the attenuation by partly rotating the mirror about the attenuation axis and partly about the switching axis. FIGS. 9A-9C depict graphs of attenuation versus wavelength for different combinations of switching axis and attenuation axis rotation using a WSS of the type shown in FIG. 1. Each of FIGS. 9A-9C includes a curve 902 with the switching axis and attenuation axis rotations coordinated for optimal coupling. For comparison, each of FIGS. 9A-9C also includes a curve 904 showing the effect of 15 dB of attenuation achieved through rotation about the attenuation axis only. Note the "rabbit ear" phenomena in curves 904. Curve 906A of FIG. 9A shows the effect of an attenuation of 8 dB due to rotation about switching axis B (corresponding in this case to a rotation of 0.101 degree) and an attenuation of 7 dB due to rotation about attenuation axis A (corresponding in this case to a rotation of about 0.727 degree). Note that the rabbit ear phenomena is reduced but not completely eliminated particularly on the right side of curve 906A.

Curve 906B of FIG. 9B shows the effect of an attenuation of 8 dB due to rotation about switching axis A (corresponding in this case to a rotation of 0.127 degree) and an attenuation of 7 dB due to rotation about attenuation axis B (corresponding in this case to a rotation of about 0.672 degree). Again, the rabbit ear phenomena has been reduced compared to curve 904 but not completely eliminated, particularly on the left side of curve 906B.

Curve 906C of FIG. 9C shows the effect of an attenuation of 10 dB due to rotation about switching axis A (corresponding in this case to a rotation of 0.145 degree) and an attenuation of 5 dB due to rotation about attenuation axis B (corresponding in this case to a rotation of about 0.562 degree). In this case, the rabbit ear phenomena has been practically eliminated.

As seen in FIGS. 9A and 9B, there is a preferred direction of rotation about the attenuation axis that reduces the size of the rabbit ear phenomena more than rotation in the opposite direction; that is, clockwise rotation versus counterclockwise rotation. The best rotation direction will depend on the interaction of the edge diffraction with the optical system and the position of the particular spectral channel in relation to the center and/or ends of the lenses in the system. In addition, there is a preferred combination of rotation directions about the switching and attenuation axes (as seen in FIGS. 9A and 9B) that minimizes the size of the rabbit ear phenomena. The architecture of embodiments of the present invention is flexible enough that the best attenuation rotation direction and/or the best combination of switching axis and attenuation axis rotation directions can be chosen for the purposes of implementing optical attenuation.

Data taken at 10 and 15 dB attenuation with mixed rotation about both axes shows that the rabbit ears decrease as the percentage of attenuation due to rotation about the switching axis increases. Current dither schemes use rotation about the channel mirror switching axis to optimize coupling efficiency and rotation about the attenuation axis to attenuate.

However, using both the switching and attenuation axes to perform the attenuation greatly compromises use of the switching axis to optimize coupling efficiency because the attenuation point is no longer near the peak of the coupling efficiency curve along the switching axis.

Figure 9D:
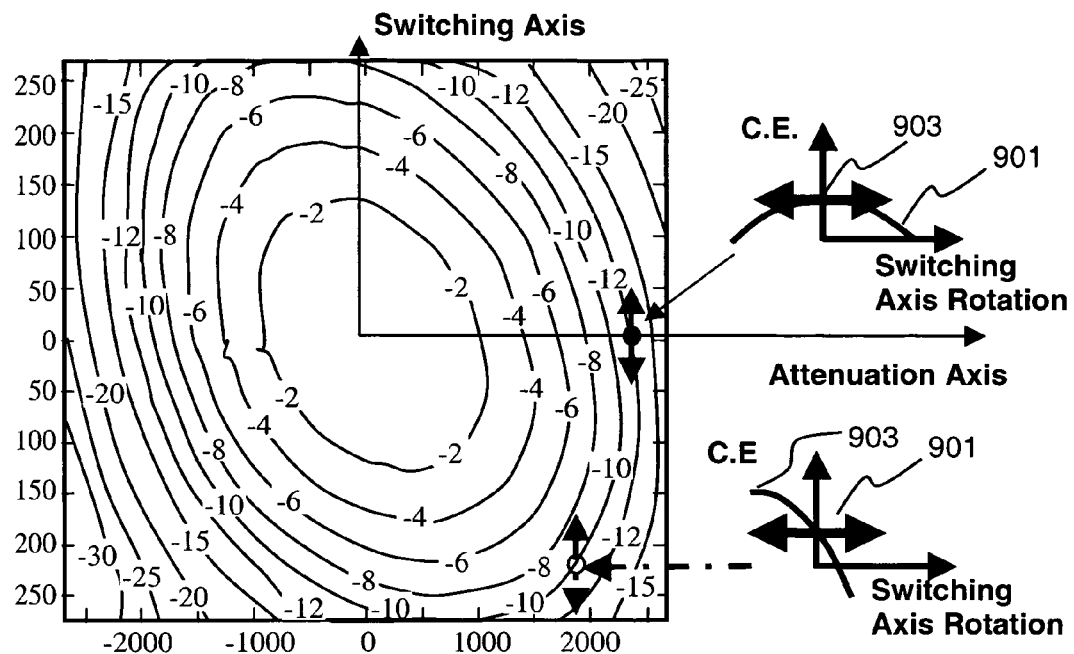
FIGS. 9D-9E are attenuation contour plots illustrating the amount of attenuation of an optical signal caused by rotation of a micromirror about an attenuation axis and a switching axis.

The attenuation contour diagram of FIG. 9D illustrates the nature of the problem. When 12 dB of attenuation is achieved by rotation about the attenuation axis alone and dithering of the mirror to optimize coupling is performed by rotation about the switching axis alone, the resulting coupling efficiency 901 varies in the vicinity of a peak 903 in the coupling efficiency curve as shown in the upper inset. However when 12 dB of attenuation is achieved by, say 8 dB due to rotation about the attenuation axis and 4 dB due to rotation about the switching axis, dithering by rotation about the switching axis cannot optimize the coupling since the attenuation point is too far from the peak 903 in the coupling efficiency curve 901 for rotation about the switching as shown in the lower inset.

Figure 9E:
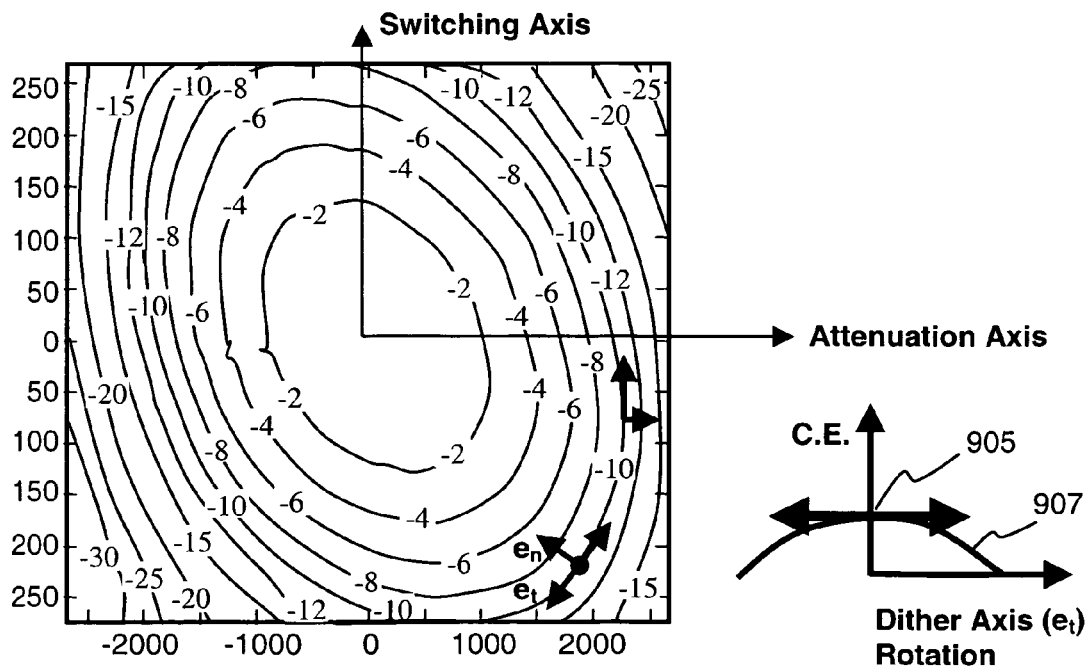

The solution to this problem is to dither the micromirror about a dither axis $e_t$ that is approximately tangent to a contour of fixed attenuation at the attenuation point as shown in FIG. 9E. If the mirror motion is about an axis sufficiently tangent to a contour of constant attenuation, the dithering with be close to a peak in the attenuation curve for rotation about the dither axis $e_t$. As a result the coupling can be optimized. Rotating the micromirror about the dither axis $e_t$ involves coupling the rotation of the switching and attenuation axes to each other so that the mirror rotates simultaneously about both the switching axis and the attenuation axis. Such combined rotation produces a local peak 905 in coupling efficiency 907 to optimize at attenuated point. The combined rotation can be produced by appropriate configuration of hardware, firmware and/or software in the electronics module 180.

Reduction of the rabbit ear phenomena through rotation about the switching and attenuation axes is largely a matter of choosing how much attenuation to obtain through rotation about the switching axis and how much to obtain through rotation about the attenuation axis. In changing the amount of attenuation, any path between two different attenuations may be taken. A preferred approach is to rotate the micromirror about both axes simultaneously to provide a continuous coupling efficiency signal along the $e_t$ direction until the maximum signal is achieved. Then attenuation is accomplished by proceeding along the $e_n$ axis from that point of maximum coupling until the desired power level or attenuation is achieved.

Figure 9F:
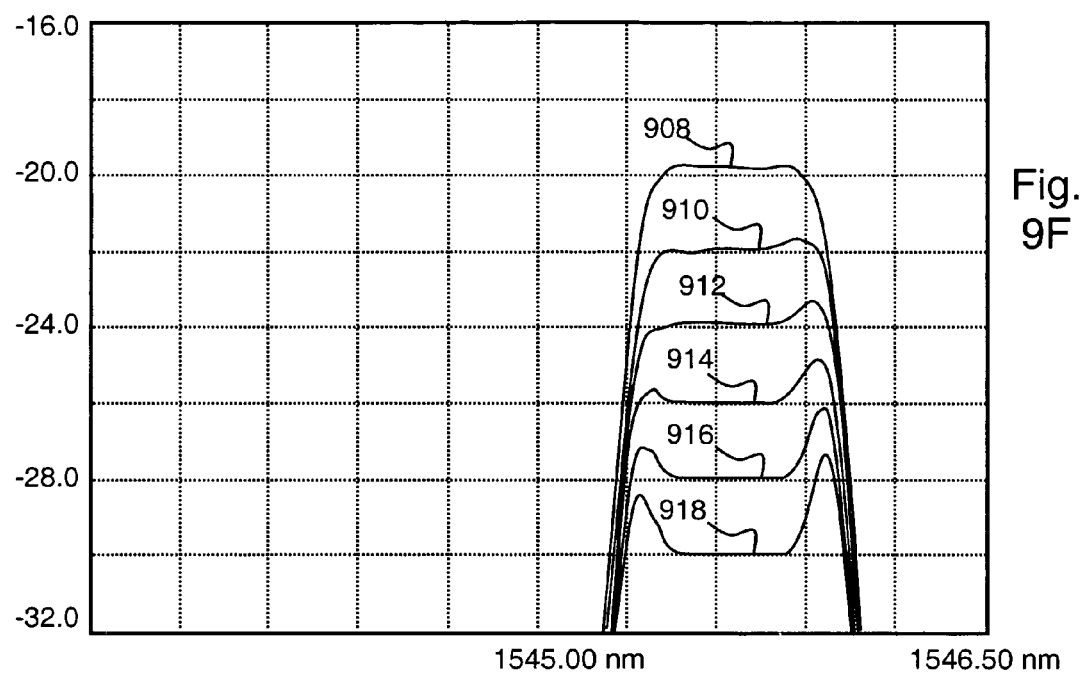
FIGS. 9F-9H are graphs of signal intensity versus wavelength in a wavelength selective switch illustrating differences in edge diffraction effects as a result of various combinations of rotation of a micromirror about an attenuation axis and a switching axis.
Figure 9G:
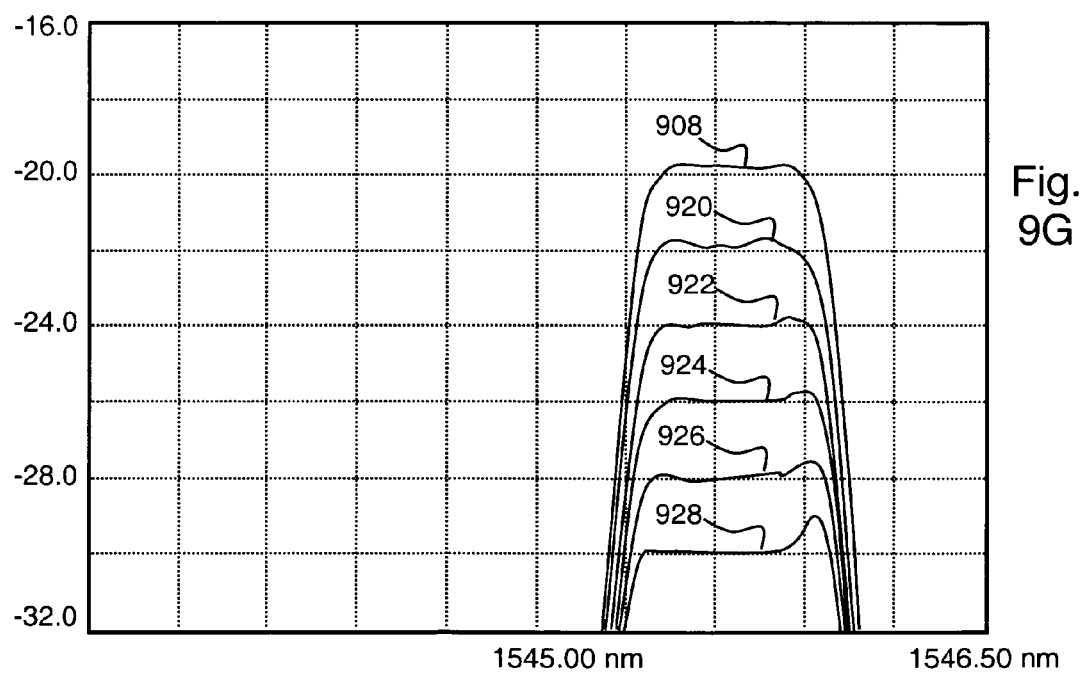
Figure 9H:
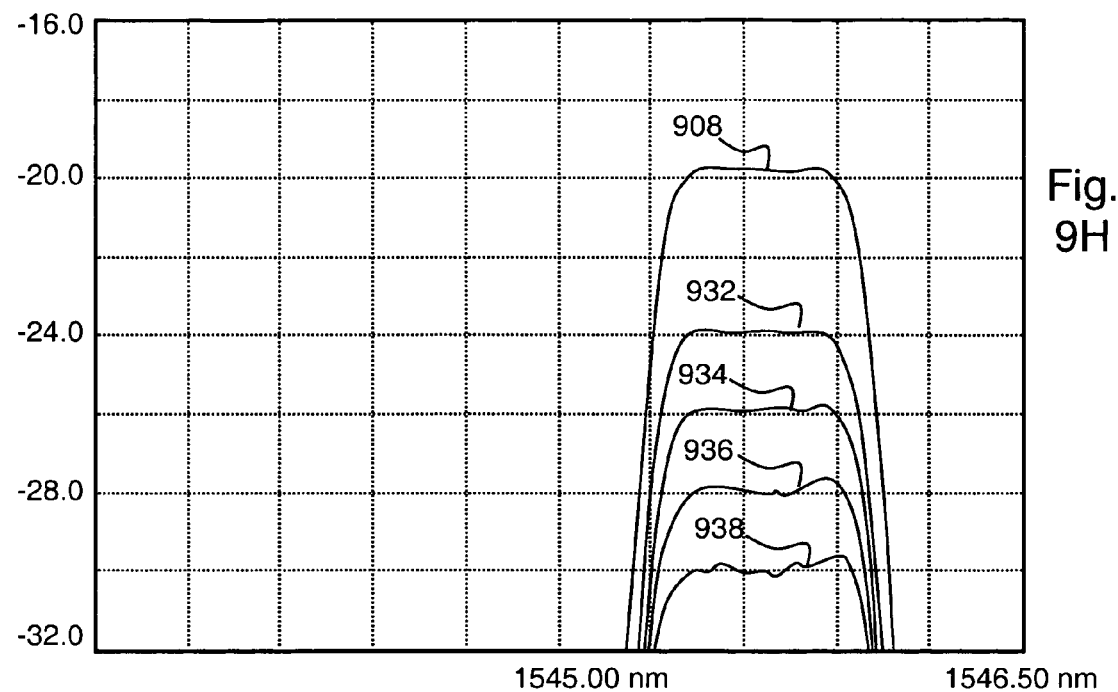

FIGS. 9F-9H illustrate some examples of different combinations of switching and attenuation axis rotation. The data for FIGS. 9F-9H were taken using a model WP4500 add module from Capella Photonics of San Jose, Calif. The dimensions of the micromirror were approximately 100 microns by 550 microns. In FIGS. 9F-9H, curve 908 shows no attenuation. In FIG. 9F, curves 910, 912, 914, 916, and 918 respectively show the result after 2 dB, 4 dB, 6 dB, 8 dB and 10 dB of attenuation have been obtained by rotation about the attenuation axis only. Note the rabbit ear peaks in curves 910, 912, 914, 916, 918.

In FIG. 9G, curve 920 shows the passband curve for 2 dB of attenuation by rotating about the switching axis only. Curve 922 shows a passband curve for 2 dB of attenuation by rotating about the switching axis and 2 dB by rotating about the attenuation axis for a total attenuation of 4 dB. Curve 924 shows a passband curve for 2 dB of attenuation by rotating about the switching axis and 4 dB by rotating about the attenuation axis for a total attenuation of 6 dB. Curve 926 shows a passband curve for 2 dB of attenuation by rotating about the switching axis and 6 dB by rotating about the attenuation axis for a total attenuation of 8 dB. Curve 928 shows a passband curve for 2 dB of attenuation by rotating about the switching axis and 8 dB by rotating about the attenuation axis for a total attenuation of 10 dB. Note the rabbit ear peak on the right hand side of curve 928.

In FIG. 9H, curve 932 shows the passband curve for 4 dB of attenuation by rotation about the switching axis only. Curve 934 shows a passband curve for 4 dB of attenuation by rotation about the switching axis and 2 dB by rotation about the attenuation axis for a total attenuation of 6 dB. Curve 936 shows a passband curve for 4 dB of attenuation by rotation about the switching axis and 4 dB by rotation about the attenuation axis for a total attenuation of 8 dB. Curve 938 shows a passband curve for 4 dB of attenuation by rotations about the switching axis and 6 dB by rotation about the attenuation axis for a total attenuation of 10 dB. Note that the rabbit ear peaks are much less pronounced in curves 932, 934, 936 and 938 than in curves 922, 924, 926 and 928 of FIG. 9G.

As can be seen from FIGS. 9F-9H, attenuating partly with rotation about the switching axis for this example, appears to require between about 2 db and about 4 dB of attenuation due to switching axis rotation. It is generally desirable to minimize the amount of attenuation using the switching axis because of cross-talk and sensitivity considerations.

Figure 9I:
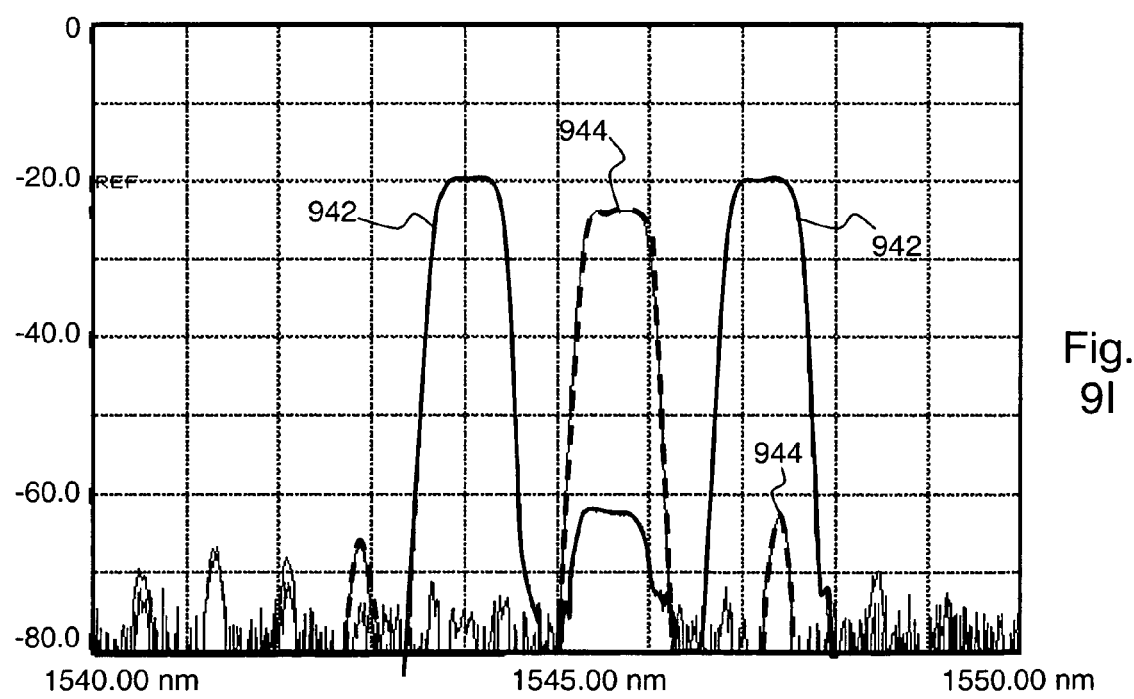
FIG. 9I is a graph of signal intensity versus wavelength for two different ports in a wavelength selective switch wherein edge diffraction effects have been reduced by rotation of a micromirror about an attenuation axis and a switching axis.

As an illustration of cross-talk considerations, FIG. 9I, shows data for signal versus wavelength for two different ports. Optical signals to both ports have been attenuated using about 4 dB of attenuation due to rotation about the switching axis. A first signal 942 indicated by a solid curve is coupled to a first port and a second signal 944 indicated by a dashed curve is coupled to a second port. Overlapping portions of the first curve 942 and second curve 944 indicate cross-talk. Although some level of cross-talk is usually present in optical switches, the amount of cross-talk that is acceptable varies. For example, the cross-talk level in FIG. 9I is about 38 dB. If the maximum cross-talk specified for the application is 40 dB, 38 dB may not be acceptable. In FIG. 9I, 4 dB of attenuation was achieved using the switching axis. In order to keep the cross-talk to an acceptable level it may be necessary to restrict the switching axis attenuation to about 3.5 dB. The amount of switching axis attenuation that will work for a given situation can be determined experimentally.

Another alternative to edge modification would be to modify the input and output ports of the fiber collimator array 102 in the WSS 100 of FIG. 1. If the port spacing is large enough one can use rotation about the switching axis to obtain the attenuation and avoid the rabbit ear phenomena.

As set forth above, another alternative is to reduce the "rabbit ear" lobes in the passband through spatial filtering. Spatial separation of the diffracted orders may be induced by a Fourier transform system so that a spatial filter aperture can be applied at a fourier transform plane to diminish the diffraction-induced side lobes and or increase the fidelity of the center portion of the passband compared to the side lobes. Such spatial filtering may be implemented, e.g., with an aperture in the WSS 100 having a size, shape and location chosen to eliminate the effects of diffraction at the edges of the channel micromirrors 118, e.g., at a focal plane within the WSS 100.

Figure 13:
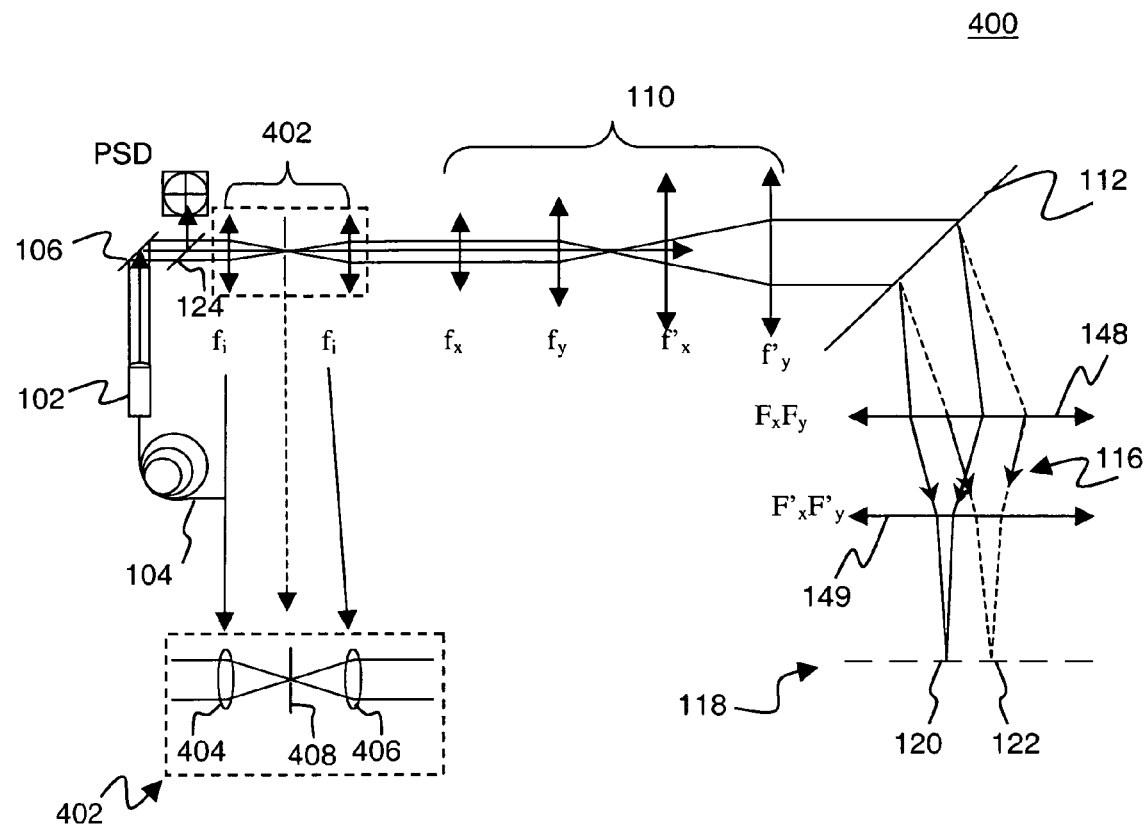
FIG. 13 is a diagrammatic view of a wavelength selective switch (WSS) having a spatial filter in accordance with an embodiment of the invention.

There are many possible spatial filter configurations. FIG. 13 depicts an example of a WSS 400 similar to that depicted and described with respect to FIG. 1. In addition to the components described above, the WSS 400 includes a spatial filter relay 402 located between the port mirror array 106 and the beam expansion and relay system 110. The spatial filter relay 402 includes a pair of relay lenses 404, 406 and an aperture 408. The lenses 404, 406 are arranged such that they share a common focal plane (the fourier plane in this example). The aperture 408 is located at the common focal plane.

Figure 14:
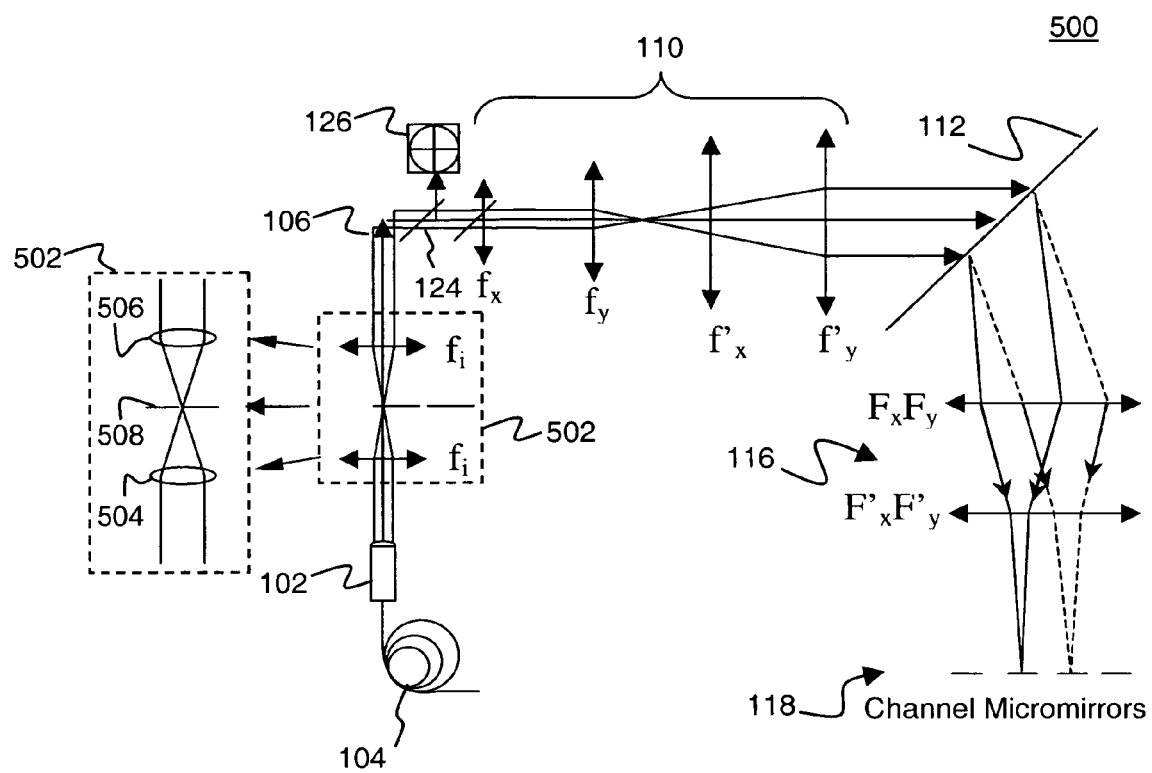
FIG. 14 is a diagrammatic view of a wavelength selective switch (WSS) having a spatial filter in accordance with another embodiment of the invention.

The aperture of the spatial filter could alternatively be located between the collimator array 102 and the port mirror array 106. For example, FIG. 14 depicts a WSS 500 similar to WSS 100 of FIG. 1. In addition to the components described above, the WSS 500 includes a spatial filter relay 502 located between the collimator array 102 and the port mirror array 106. The spatial filter relay 502 includes an aperture 508 located between two relay lenses 504, 506 at their common focal plane. In FIGS. 13 and 14, the spatial filtering may be selectively applied to only one port, e.g., the express port. Alternatively, individual spatial filters can be placed at some of the output ports (e.g., only the express port) or at all of them.

Figure 15:
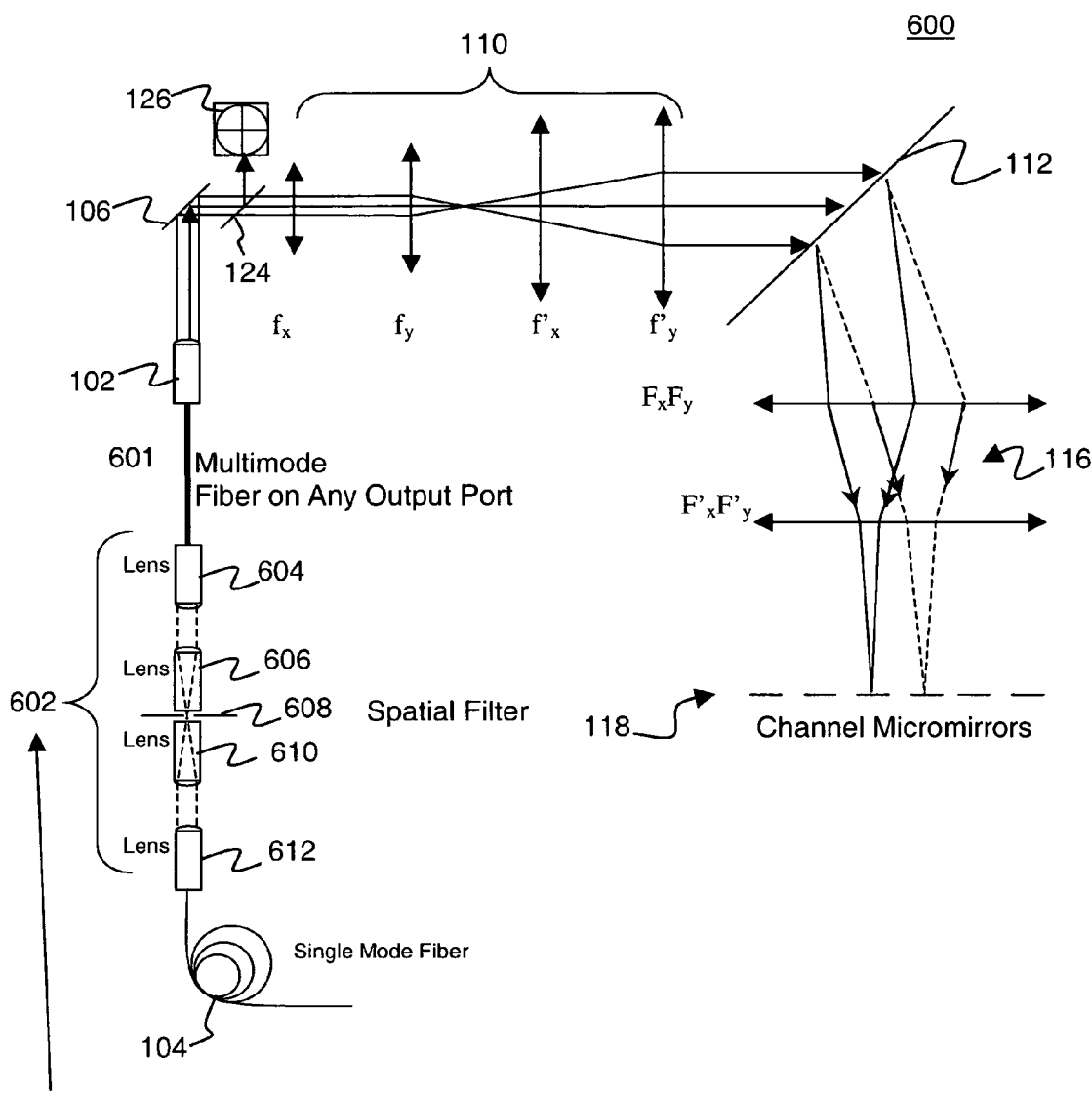
FIG. 15 is a diagrammatic view of a wavelength selective switch (WSS) having an externally implemented spatial filter in accordance with another embodiment of the invention.

In some embodiments, the spatial filter aperture may be placed external to the WSS. For example FIG. 15 depicts a WSS 600 similar to that depicted and described with respect to FIG. 1. In addition to the components described above, the WSS 600 includes a multimode optical fiber 601 connected at one end to any of the output ports, e.g., via the fiber collimator array 102. The other end of the multimode fiber 601 is coupled to a first collimator lens 604 that is optically coupled to a second collimator lens 612. A spatial filter relay 602 is optically coupled between the first and second collimator lenses 604, 612. The spatial filter relay 602 includes an aperture 608 located between two relay lenses 604, 606 at their common focal plane. An advantage of this system is that it can reduce the effects of non-uniform passband attenuation on a WSS like that shown in FIG. 1 without having to reconfigure the internal optics. Furthermore, spatial filtering can be selectively applied only to those ports requiring reduction of non-uniform attenuation.

Figure 16:
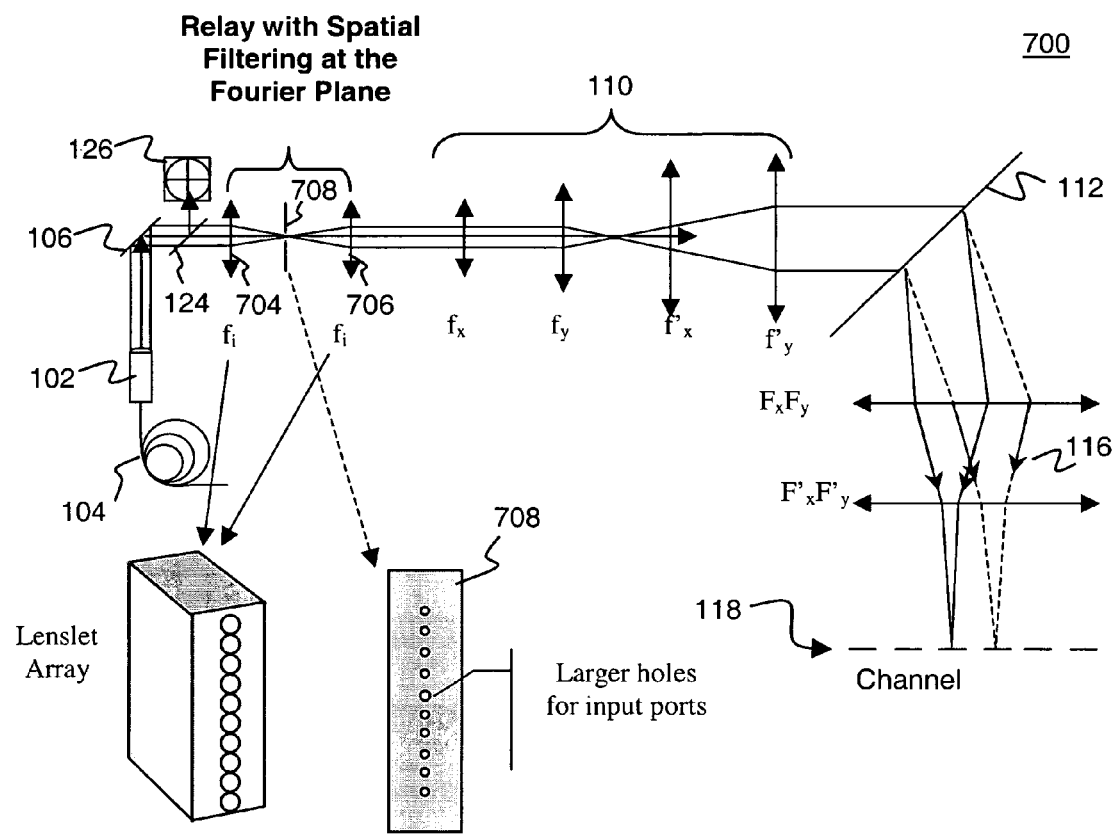
FIG. 16 is a diagrammatic view of a wavelength selective switch (WSS) having an internal spatial filter for all ports in accordance with another embodiment of the invention.

FIG. 16 depicts an alternative multi-port implementation of spatial filtering in a WSS 700. In addition to the components described above, the WSS 700 includes a spatial filter relay 702 located between the port mirror array 106 and the beam expansion and relay system 110. The spatial filter relay 702 includes a pair of relay lens arrays 704, 706 and an aperture array 708. As shown in the inset, each of the lens arrays 704, 706 is made up of arrays of lenslets. Corresponding lenslets in the first and second lens arrays are arranged such that they share a common focal plane. The apertures in the aperture array 708 are located at the common focal plane. The spatial filtering is more important for spectral beams reflected from the channel micromirrors. Consequently, the apertures corresponding to output ports may have smaller diameters than apertures corresponding to input ports.

Figure 17:
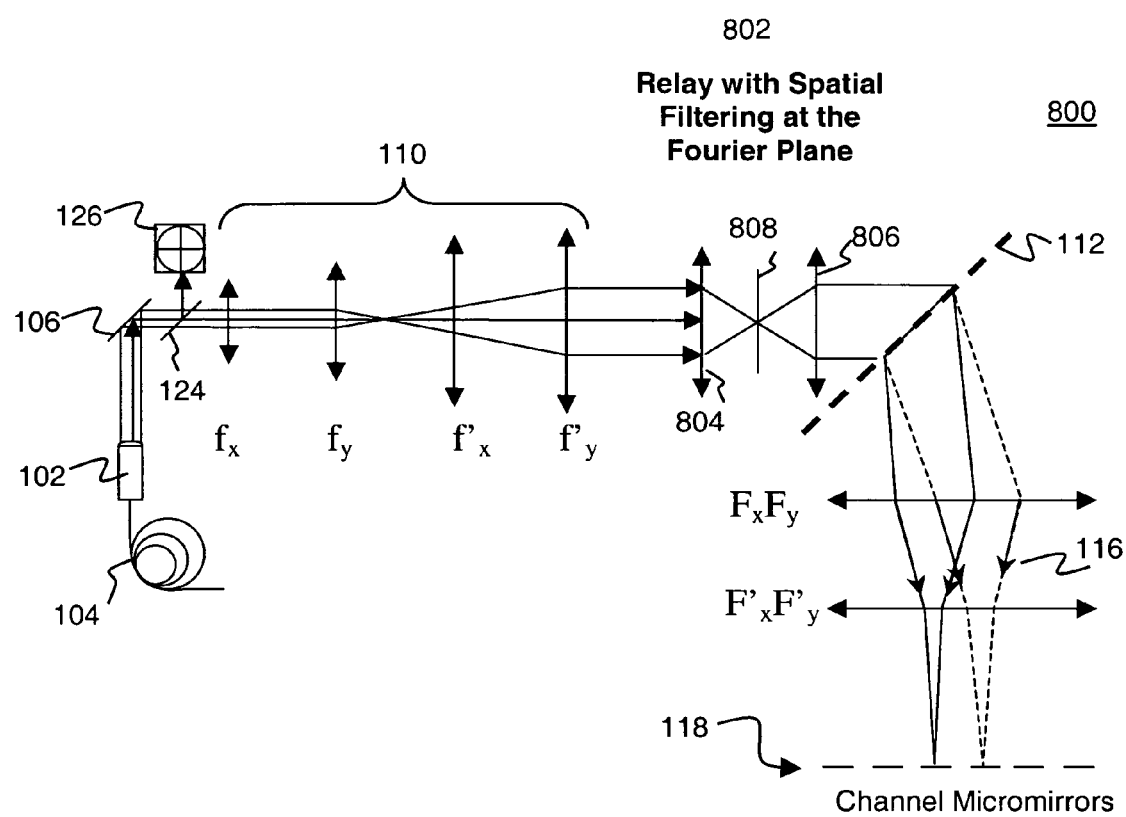
FIG. 17 is a diagrammatic view of a wavelength selective switch (WSS) having an internal spatial filter for all ports in accordance with another embodiment of the invention.

FIG. 17 depicts another alternative multi-port implementation of spatial filtering in a WSS 800. In addition to the components described in FIG. 1, the WSS 800 includes a spatial filter relay 802 located between the beam expansion and relay system 110 and the wavelength separator 112. The spatial filter relay 802 includes a pair of relay lens arrays 804, 806 and an aperture array, or opposing knife edges, or appropriate phase mask 808. Each of the lens arrays 804, 806 may be made up of arrays of lenslets or y-cylindrical lenses. The corresponding lenslets in the first and second lens arrays or the corresponding y-cylindrical lenses are arranged such that they share a common focal plane. The apertures in the aperture array 808 are elliptical in shape and are located at the common focal plane. The spatial filtering is more important for spectral beams reflected from the channel micromirrors. Consequently, the apertures corresponding to output ports may have smaller diameters than apertures corresponding to input ports.

Figure 18A:
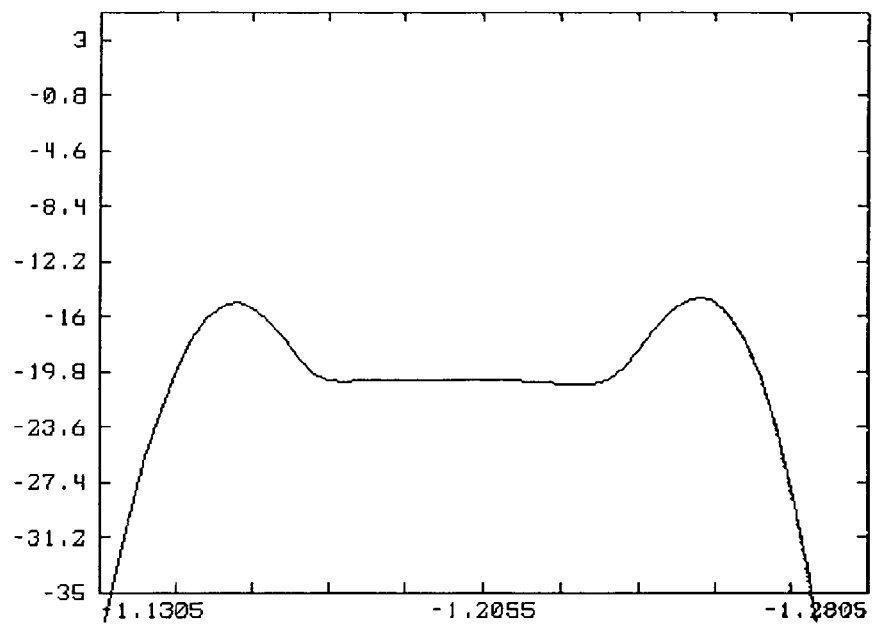
FIGS. 18A-18B are graphs depicting the effect of spatial filtering on the optical passbands of wavelength selective switching systems.
Figure 18B:
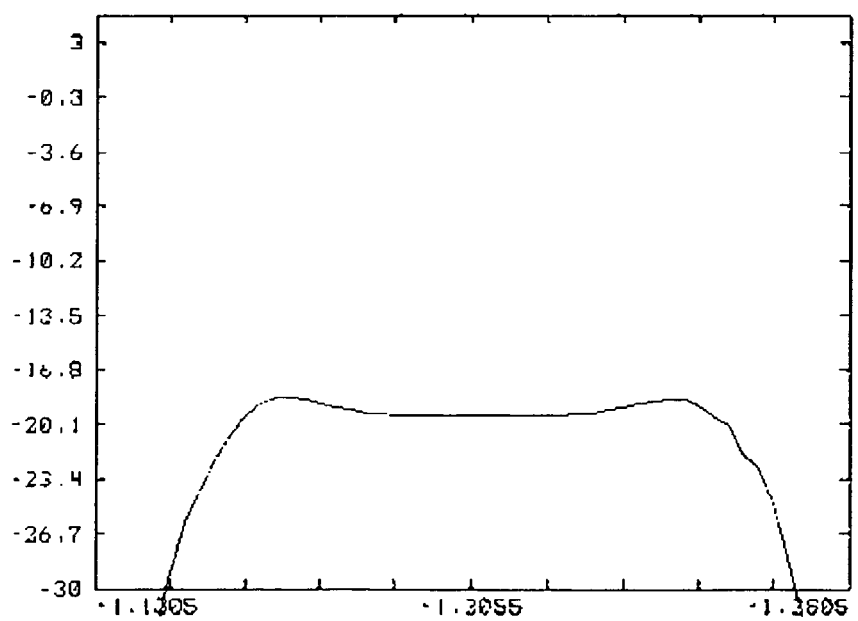

The reduction of the "rabbit ear" effect is more pronounced for smaller diameter apertures. The effectiveness of spatial filtering in reducing the "rabbit ear" effect can be seen in the computer modeled passband graphs FIGS. 18A and 18B. FIG. 18A depicts a passband for a WSS of the type shown in FIG. 1 with no spatial filtering and −20 dB of attenuation. Note the pronounced "rabbit ears" at the edges of the passband. FIG. 18B depicts a passband for a similar WSS having a spatial filter with a 0.0052 mm radius aperture. Note that there is much more attenuation at the edges of the passband in FIG. 18B compared to that of FIG. 18A.

In addition to spatial filtering there are other possible filter techniques that may be used to reduce the side-lobe non-uniformity of the pass band of a WSS. For example, the angular frequencies, and or scattered light from the channel micromirrors may be filtered to some degree by the diffraction efficiency of the grating 112 as a function of angle of incidence, sometimes called the angular Bragg width, where the greater the angle of incidence the lower the diffraction efficiency. This effect can mean that diffracted and or scattered light is in effect filtered by the grating 112 by virtue of not being efficiently diffracted by the grating. Thus, in some embodiments, angular Bragg width of the grating 112 may allow the grating 112 to filter out or reduce the higher angular frequencies that contribute to the "rabbit ear" side lobes. Such reduction of the amplitude of the side lobes during attenuation may be combined with modification of the edges of the channel micromirrors 118.

Figure 10A:
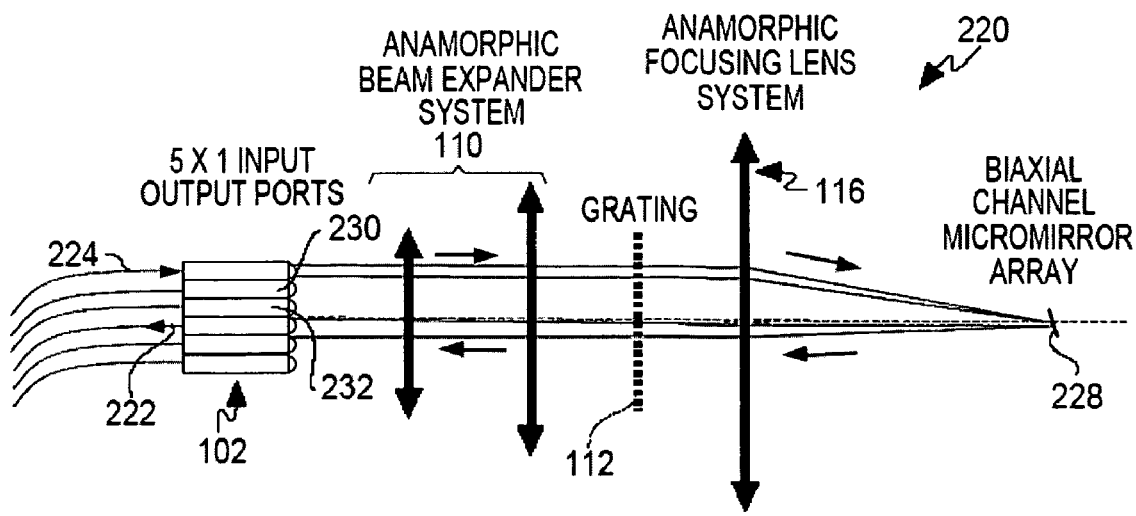
FIGS. 10A-10C are diagrammatic views that illustrate hitless switching according to an embodiment of the invention in a first embodiment of an ADD module.
Figure 10B:
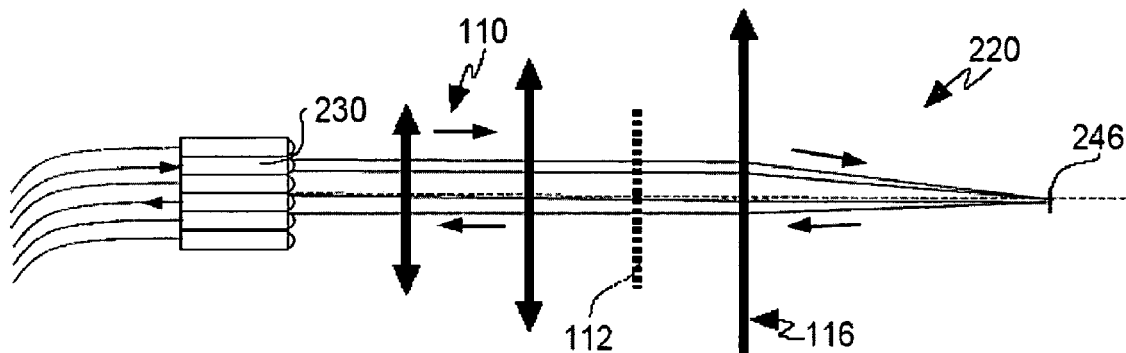
Figure 10C:
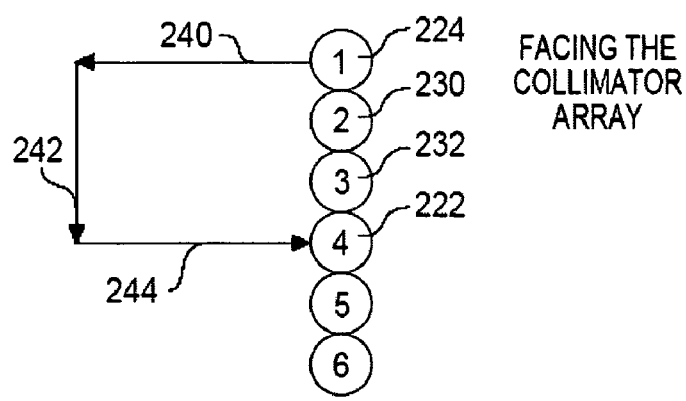

In some embodiments of the invention it is desirable to use a WSS configured for hitless switching. Such hitless switching may be combined with embodiments of the present invention that reduce the "rabbit ear" effect due to diffraction as described above. By way of example, FIGS. 10A-10C illustrate hitless switching in the context of an ADD multiplexer module 220, in which spectral channels may be input to the module on more than one input port and added to, i.e., combined with, the signal at the output port. FIGS. 10A-10B generally represent simplified diagrammatic side views of the WSS 100 of FIG. 1, where certain of the elements of FIG. 1 have been omitted for clarity.

As indicated in FIGS. 10A-10B, the ADD multiplexer 220 may comprise a 5×1 device having five input ports and one output port. The fiber collimator array 102 accordingly comprises six collimators, as shown in the figure. The output port 222 may be, for example, the fourth collimator port, as shown. In FIG. 10A, the first (top) collimator port 224 may input a spectral channel $\lambda_i$ that is focused by the anamorphic beam expander system 110 onto the diffraction grating 112. The diffraction grating spatially separates the spectral channel $\lambda_i$ from other wavelength channels, and supplies the separated spectral channel to the anamorphic focusing lens system 116, which focuses the spectral channel onto a corresponding channel micromirror 228. The channel micromirror may be rotated about its switching axis to the appropriate angular position to reflect (switch) the input spectral channel $\lambda_i$ back through the optical system to output port 222, as shown in FIG. 10A.

Switching the input spectral channel $\lambda_i$ from the input port 224 to the output port 222 may be done in a hitless manner. With hitless switching, the light input at port 224 is not scanned across the intermediate ports 230 and 232 as the channel micromirror is rotated to switch the beam to port 222. Rather, for hitless switching, the light is substantially attenuated or blocked during switching. To accomplish this, the servo control loop controlling the switching axis of channel micromirror 228 is first disengaged. A control voltage may be applied to the channel micromirror to rotate the micromirror about its attenuation axis by an amount required for blocking; the channel micromirror may then be rotated about its switching axis to reflect the input spectral channel to output port 222 by applying to the switching axis a preset control voltage stored in calibration tables in the electronics module memory of the control system of FIG. 4. Micromirror 228 may next be rotated about its attenuation axis back to a normal optimal coupling condition, and the servo control loop controlling the switching axis may then be re-engaged to control the micromirror to achieve optimum coupling efficiency.

FIG. 10C illustrates diagrammatically the process as light is switched from the input port 224 to the output port 222. Attenuating the input channel to a blocking condition is represented by the arrow 240 in FIG. 10C. Switching of the input channel by rotating micromirror 228 to port 222 is represented by the arrow 242 which indicates that as the light is switched between input port 224 and output port 222 no light is coupled to intermediate ports 230 and 232. The arrow 244 represents increasing the light back to a nominal optimal coupling condition by rotation of the channel micromirror about its attenuation axis.

FIG. 10B illustrates a second spectral channel at a different wavelength $\lambda_j$ entering the ADD multiplexer on port 230 and being switched by its corresponding micromirror 246 to output port 222. This switching may similarly be hitless and accomplished in a similar manner to that described above in connection with FIG. 10A. The optical signal output on port 222 in FIG. 10B thus may comprise a combination of $\lambda_i$ input on port 224 and $\lambda_j$ input on port 230. In a similar fashion, other wavelengths may be input on the other input/add ports and be switched to output port 222 to form a composite multi-channel signal.

Controlling the optical signals as shown in FIGS. 10A-10B in order to switch from a first attenuated state to a second different attenuated state at the output port may be accomplished by different methods. According to a first method, the light entering the input port may be in a maximum coupling state, i.e., to full power. Next, hitless switching from the input port to the output port may be accomplished by using the attenuation axis for maximum attenuation, as represented in FIG. 10C, while the input beam is switched hitlessly to the output port as described above. Once the beam is at the output port, the attenuation axis can be controlled to return to full power corresponding to zero attenuation. The coupling efficiency may then be optimized at the full power condition, and, upon achieving optimal coupling; the beam is attenuated by controlling the movement of the channel micromirror about its attenuation axis to provide the desired output power level.

A second method is to go directly from the original attenuated state at the input port to the desired attenuated state at the output port without first unattenuating to maximum coupling efficiency. This method utilizes calibrated voltages stored in look-up tables in the memory of the electronics module of the control system that specify the attenuation level for each channel micromirror as a function of rotation angle (e.g., electrostatic voltage) about the attenuation axis.

A third and preferred method for hitless switching is to go from an attenuated state at an input port to a low light state at that port by rotation about the attenuation axis to minimize the power. Next, a hitless switch to the desired destination port is performed with the attenuation-axis retained at the minimum power, e.g., the blocking condition. Then, upon reaching the destination port, the channel micromirror is rotated about the attenuation axis to go to a low light level such as, for example, −20 dB, rather than back to full power; the coupling efficiency at the low light level may then be optimized using the switching axis of the channel micromirror (and, preferably, also the corresponding port mirror 106 shown in FIG. 1, in a manner to be described shortly). Then, upon achieving optimal coupling efficiency, the channel micromirror may be rotated about its attenuation axis for the desired power level.

In addition to controlling coupling efficiency by controlling the rotation of a channel micromirror about its switching axis, it is also desirable to control the location at which the spectral beam of each channel is focused on to its corresponding channel micromirror. In order to afford a high passband, and a high data transmission rate, the center wavelength of the channel should be aligned to the center of the channel micromirror. The center wavelengths of other channels should similarly be aligned with the center of their corresponding micromirrors. Channel spacing is specified by ITU grid specifications, and the channel micromirrors are laterally spaced in the array according to the ITU grid spacing of the input multi-channel optical signal. It is, therefore, desirable to maintain ITU alignment so that the center wavelengths of all channels remain centered on their corresponding micromirrors in order to maximize the passband of the system.

A WSS system incorporating embodiments of the invention as described above may be configured to establish and maintain ITU alignment under adverse operating conditions. As previously described, WSS 100 of FIG. 1 may include a beam splitter 124 located within the optical beam path between the port mirror array 106 and the anamorphic beam expander and relay system 110. Reference light, e.g., 1310 nm wavelength from a light-emitting diode (not shown), may be coupled into the composite multi-wavelength optical system at the input port of the fiber collimator array. The beam splitter may be formed to preferentially reflect the 1310 nm wavelength light beam to the PSD 126 and pass the spectral channel wavelengths, e.g., at C-band, to the anamorphic system 110. The PSD may comprise an array of photocells arranged in the form of a 4-quadrant photodetector, i.e., a "quad cell". The 1310 nm reference light reflected from the beam splitter onto the PSD causes voltage potentials to be developed in each quadrant of the PSD that can be used to determine the centroid position of the reference light beam impinging upon the PSD. The centroid position can be used to determine alignment of the beam.

The direction in which the input collimator 102 points may change as a function of temperature, causing the location at which an input spectral beam is focused onto a micromirror to deviate from the center of the micromirror, producing ITU misalignment and narrowing of the channel passband. In addition, other thermal-mechanical effects may cause changes in the diffraction grating angle, the positions of the channel micromirrors, and the focal length of the optics. Each of these effects can also result in ITU misalignment and passband narrowing. In order to compensate for ITU misalignment, the port mirrors may be rotated to realign the channel center wavelength onto the center of the channel micromirrors.

In the embodiment of the WSS shown in FIG. 1, the angular position of a port mirror is relayed onto the entrance aperture of the telecentric focusing optics, and angular changes at the input to the telecentric optical system due to changes in the position of a port mirror are translated into changes in spot position at the focal plane. Accordingly, rotation of a port mirror causes a channel to scan across its associated channel micromirror. When the center wavelength of the channel is aligned with the center of the channel micromirror, corresponding to ITU alignment, the reference light beam reflected from the beam splitter 124 will impinge upon the PSD at a predetermined location. The voltages produced by the four quadrants of the PSD, which represent beam alignment, may be compared to pre-set reference voltages stored in a memory of the control electronics 128, and used by the control electronics as a feedback signal to control the port mirror to center the beam on the channel micromirror.

If the pointing of the collimator or one or more of the other previously described elements changes due to changes such as system temperature, a new port mirror angle and reference light beam position (x1, y1) on the PSD will be needed to maintain ITU alignment. Accordingly, a set of calibration points may be generated for the required PSD spot position as a function of temperature to maintain ITU alignment, and the calibration points stored in a table in the memory of the control electronics 128. Temperature sensors may be located within the WSS module to monitor temperature changes, and the temperature information and set point information from the calibration table is supplied to a feed forward servo system in the control electronics to control all of the port mirrors of the array to maintain ITU alignment. To account for variations due to hysteresis, for example, calibration information may be stored in the table for both increasing and decreasing temperature conditions.

Another advantage of the architecture of embodiments of the invention is that it affords the ability to confirm the distribution of wavelengths in the various output or pass-through ports of an ADD module, such as that shown in FIGS. 10A-10B (or in FIGS. 11 and 12 to be described shortly), or in the output and drop ports of a DROP module. Wavelength identification may be accomplished by inducing small amplitude, low frequency dither modulation on the optical signals reflected from a port micromirror, as, for example, by causing a small amplitude dither rotation of the port micromirror, and detecting the modulation in the feedback control system of FIG. 4.

The dither may be asserted about either axis of rotation of the port micromirror. Dithering modulates the optical signals associated with a particular output or pass-through port that are reflected by that port micromirror. The modulation preferably creates a power fluctuation in the signals of the order of approximately 0.05 dB at the pixels of the photodiode array 196 in the optical channel power monitor 176 of FIG. 4. This power fluctuation may be converted into an electronic signal and supplied to the control software in the electronics module 180 to indicate the optical signal wavelengths being directed into the output or pass-through port by the port mirror undergoing the dither rotation. The dither frequency of the port mirror is preferably a low frequency (approximately 100 to 200 Hz) as compared to the frequencies of the telecommunication signals being transmitting by the optical signals so as not to cause significant noise or disruption.

In a typical ring network, there may be several wavelength selective switch modules in operation simultaneously. If each wavelength selective switch module in the ring network utilizes the same dither frequency to indicate the wavelengths passing through a port, there could be a significant accumulation of noise at the dither frequency in the telecommunication signal. Therefore, it may be desirable to use a different dither frequency for each module in the network ring. To accomplish this, each WSS module may be assigned a unique dither frequency, preferably one that is at least 5 Hz different from that of other WSS modules in the ring. The frequency assignment process may be automated, as for example, by performing an electronic search for dither frequencies already in use, and then assigning a frequency that is not being utilized.

The 5×1 (N×M) architecture of the ADD module 220 shown in FIGS. 10A-10B is typical of an ADD module, where optical channel signals having center wavelengths $\lambda_1$ to $\lambda_n$ can enter in any combination through N input and add ports, and exit through one (M=1) output port. There is no theoretical limitation to the number of in and add ports (N) in this architecture or to the number of wavelengths. However, there is a restriction that a particular wavelength $\lambda_i$ can only enter from one port. Multiple $\lambda$'s can enter from either the input or add ports so long as these $\lambda$'s are different from one another.

Figure 11:
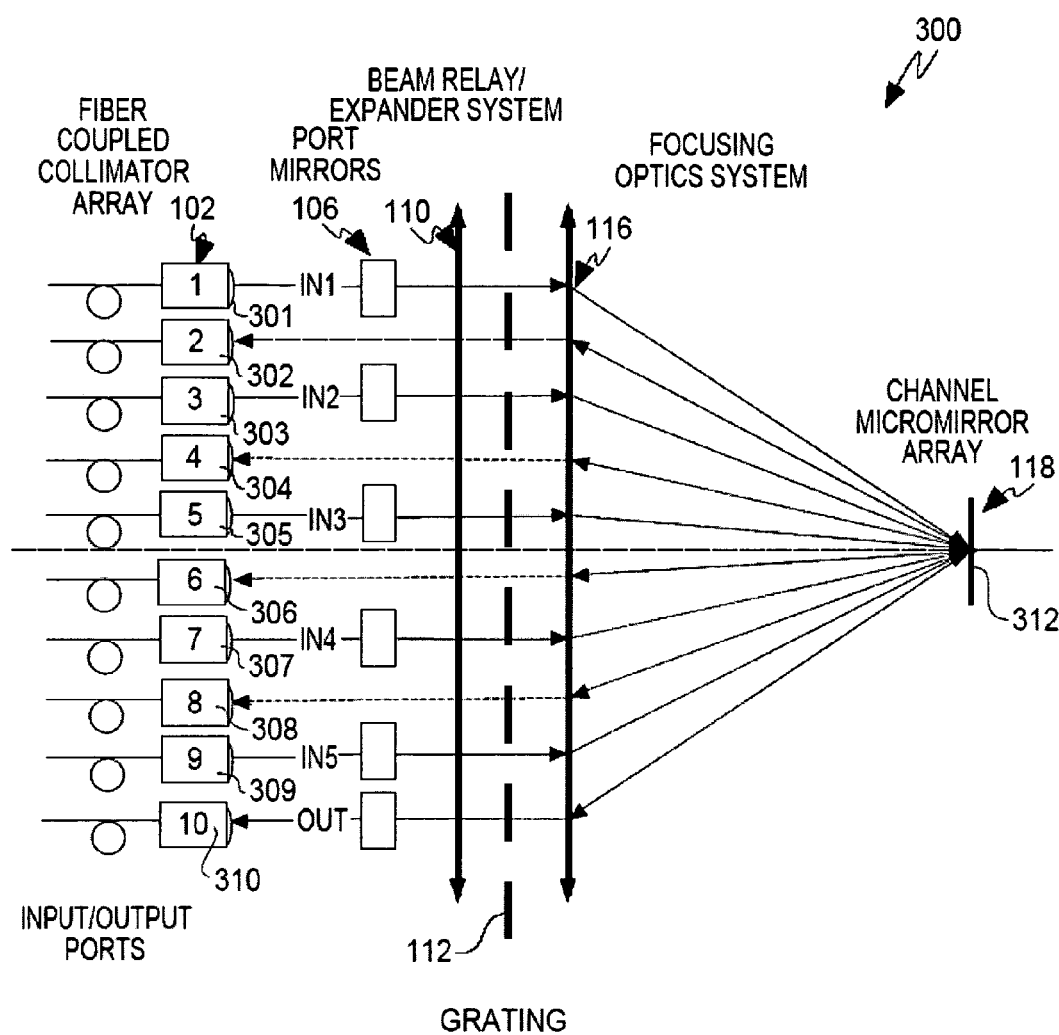
FIG. 11 is a diagrammatic view of a second embodiment of an ADD module that may be employed in embodiments of the invention.

FIG. 11 is a simplified figure which illustrates another embodiment of an ADD module 300 architecture that circumvents the foregoing limitation. (The multiple micromirrors are into the plane of the paper.) As shown, this embodiment is a 5×1 and 1×5 module having 5 input or add ports (IN1-IN5) and 5 output ports arranged so that the odd numbered ports (301, 303, 305, 307 and 309) are input/add ports and the even numbered ports (302, 304, 306, 308 and 310) are output ports. However, in this arrangement, all ports but the bottom (in the figure) port, OUT 310, are "dark" ports, meaning that light going to these ports disappears. The advantage of the configuration of FIG. 11 is that it allows an optical channel of a particular wavelength $\lambda_i$ to enter from more than one input or add port. However, only one of the channels of wavelength $\lambda_i$ will exit through the OUT port 310. This is because the angle of the channel micromirror 312 associated with wavelength $\lambda_i$ determines the direction in which the beam will reflect. This in turn determines the output port through which that wavelength $\lambda_i$ will exit. All other wavelengths $\lambda_i$ will exit through some other dark output port or into free space. For example, a second signal of wavelength $\lambda_i$ entering through port 303 will be directed by the channel micromirror 312 to port 308. The configuration shown in FIG. 11 has numerous applications in optical telecommunications systems, as for example, where it is desired to combine multiple input groups of wavelengths together to form a single output group of wavelengths without any duplicate wavelengths.

Figure 12:
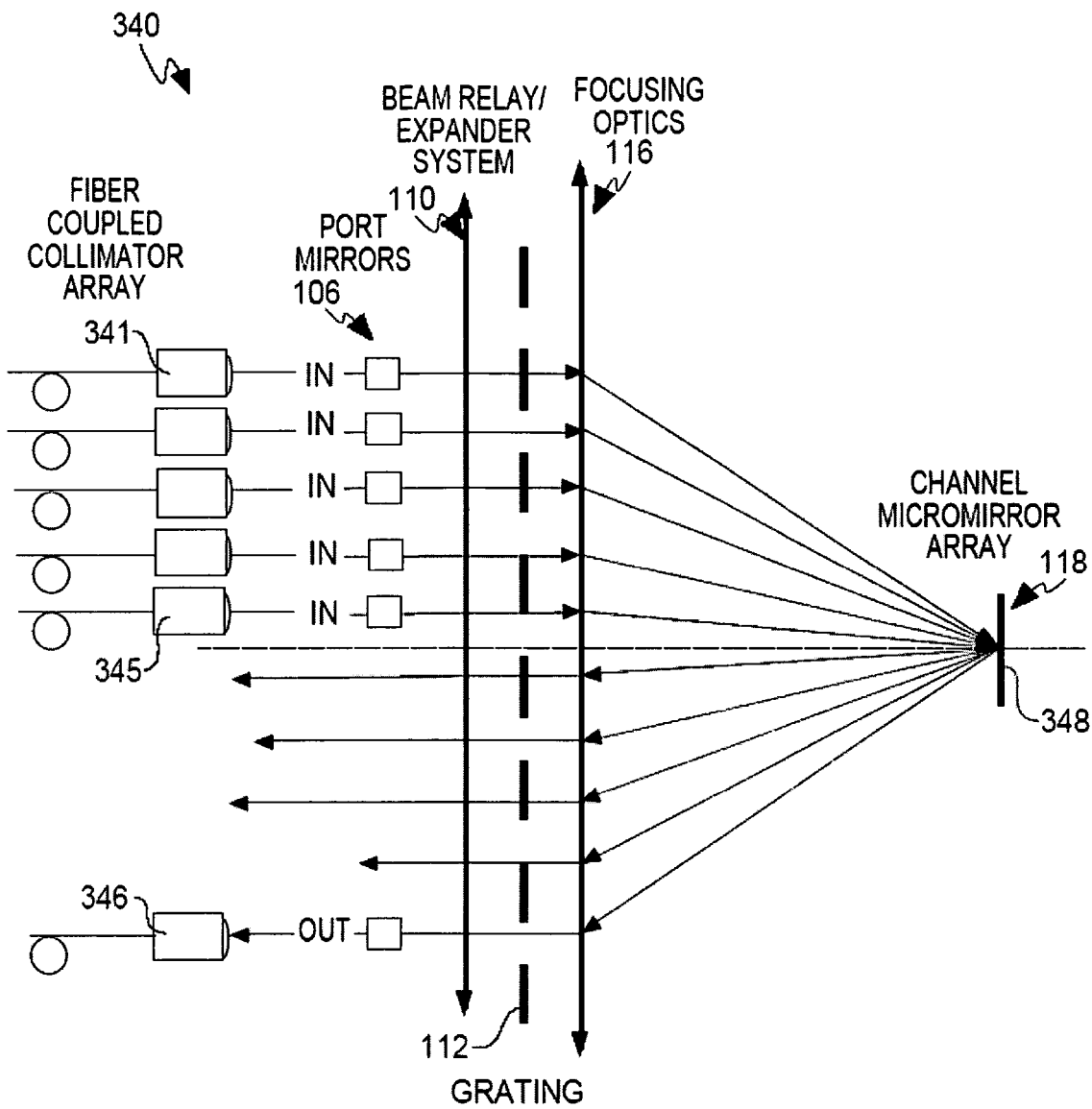
FIG. 12 is a diagrammatic view of a third embodiment of and ADD module that may be employed in embodiments of the invention.

FIG. 12 illustrates another embodiment of a 5×1 ADD module 340 that is similar in function to the embodiment of the ADD module 300 shown in FIG. 11. ADD module 340 may comprise 5 input or add ports 341-345, and 1 OUT port 346. It has a similar advantage to ADD module 300 in that a particular wavelength $\lambda_i$ can enter from multiple ones of the input or add ports 341-345. However, depending on the angle of the channel micromirror 348 associated with wavelength $\lambda_i$, only one of the entering channels of wavelength $\lambda_i$ will exit through the OUT port 346. All of the other entering wavelengths $\lambda_i$ will exit to free space. The principal difference between the previous two ADD module configurations of FIGS. 11 and 12 is a different physical layout. The operation of the two is substantially the same.

The WSS optical module 162 shown in the feedback control arrangement of FIG. 4 is representative of a DROP module where there is one input port and multiple output or drop ports. In a DROP module, power management of output optical channels may be implemented, as shown in FIG. 4, by sampling a percentage of the light from the outgoing fiber of each output or drop port, as shown in FIG. 4, and using the samples in a control system as described previously to measure and control the optical power of each channel to obtain desired power levels.

In the case of an ADD module, such as illustrated in FIGS. 10A-10C and FIGS. 11-12, the same methods of channel alignment and power level control of output channels as previously described also may be employed. However, in an ADD module, power management may be additionally applied to the optical channels entering the input and add ports. This may be accomplished by sampling a percentage of the light from the spectral channels entering each of the input and add ports, combining the samples into a composite multi-channel signal in the same way as described in connection with FIG. 4, and providing the composite optical signal to an optical channel monitor and control system, such as described previously in connection with FIG. 4, in order to control the channel micromirrors to obtain desired power levels for the incoming optical signals.

For an ADD module, power level control of both input and output channels may be implemented by either of two different approaches. One approach may employ separate optical channel monitors, one for the light power in the input and add fibers, and one for the light from the output and drop fibers. The two channel monitors may be substantially the same as shown and described in FIG. 4, and may employ either the same or separate electronics modules for controlling the attenuation axes of the channel micromirrors. This would allow simultaneous monitoring and control of the power of both the incoming and outgoing spectral channels.

A second approach would be to employ separate combiners, such as combiner 172, one for the input and add channels and one for the output and drop channels, a 1×2 switch to select the composite signal from either the input or output combiner, and a single optical channel monitor and electronics module which would monitor and control the incoming light or the outgoing light depending on the position of the switch. The incoming light and pass-through light may be monitored if a specific attenuation level is sought, and the outgoing light may be monitored if a specific power level is desired.

In accordance with certain embodiments of the invention, the method of maintaining channel beams centered on their associated channel micromirrors for ITU grid alignment in both ADD and DROP modules may be similar to that previously described in connection with FIG. 1. In an ADD module, the reference light may be injected into (combined with) the input light from one incoming fiber and focused onto a single quad cell, as described. However, because other add ports may also contain other incoming spectral channels, any change in alignment of those spectral channels may be compensated for by a calibrated amount of rotation about one or both axes of each of the micromirrors in the port mirror array associated with the add ports. That is, the micromirrors in the port mirror array associated with the add ports may be slaved to the micromirror in the port mirror array associated with the input port, so that all input and add port micromirrors may be controlled together based upon control of the input port.

From the foregoing, it can be seen that reconfigurable optical add-drop systems and methods in accordance with the embodiments of the invention afford a simplified and integrated architecture having a number of advantages. Among others, these include effective, flexible and highly accurate methods of power management of individual spectral channels on a channel-by-channel basis; hitless switching of channels that avoids cross-talk and interference to intermediate channels; notchless operation that enables accurate management of power across channels and operation at various wavelength grid spacing; optimization of optical characteristics resulting in high passband and ITU channel alignment; and optimum mechanical characteristics of both the modules and components such as micromirrors.

While the foregoing description has been with reference to particular embodiments of the invention, it will be appreciated by those skilled in the art that changes may be made in these embodiments without departing from the spirit and principles of the invention, the scope of which is defined in the appended claims.

While the above includes a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

The invention claimed is:

1. Optical apparatus for switching multi-channel optical signals having spectral channels of different wavelengths, comprising:
a plurality of input and output ports for optical signals having one or more of said spectral channels;
an optical beam expander and relay system adapted to receive the optical signals from one or more of the input ports, the optical beam expander and relay system being formed to convert the optical signals to spectral beams having a predetermined elongated beam profile;
a wavelength separator for spatially separating the spectral beams into constituent spectral channels; and
an array of channel micromirrors, each channel micromirror of the array being positioned to receive one of said constituent spectral channels, the micromirrors being rotatable about a switching axis to switch said one spectral channel to a selected output port;
wherein each channel micromirror is rotatable about an attenuation axis to vary coupling of the switched spectral channel to the selected output port to control a power level of the spectral channel output at such selected port, wherein the attenuation axis is different from the switching axis,
wherein each channel micromirror is configured to attenuate the power level through a combination of rotations about the switching axis and the attenuation axis sufficient to reduce a non-uniform attenuation of a passband of the apparatus due to diffraction of a spectral beam from an edge of one or more of the micromirrors, wherein the edge is substantially parallel to the attenuation axis, and
wherein, for a given level of attenuation of a spectral channel achieved by rotation of the corresponding channel micromirror about the attenuation axis and the switching axis, the corresponding channel micromirror is configured to dither with respect to a dither axis by rotating the corresponding channel micromirror simultaneously about the switching axis and the attenuation axis, wherein the dither axis is approximately tangent to a contour of constant attenuation of the corresponding spectral channel, wherein the contour of constant attenuation represents a plurality of different combinations of rotations of the corresponding channel micromirror about the switching axis and the attenuation axis that achieve the given level of attenuation of the spectral channel.

2. The apparatus of claim 1 wherein the input and/or output ports are sufficiently far apart that the effects of diffraction of a spectral beam reflected from the edge are reduced by rotating the micromirror partly about the switching axis and partly about the attenuation axis.

3. The apparatus of claim 1, wherein a combination of rotations of the channel micromirror (clockwise versus counterclockwise) about the switching and attenuation axes, respectively, are chosen to minimize edge diffraction effects at an attenuated state.

4. The apparatus of claim 1 wherein the optics include an anamorphic system configured to convert the optical signals to spectral beams having a predetermined elongated beam profile.

5. The apparatus of claim 1 wherein each of the channel micromirrors has an elongated shape corresponding to said beam profile.

6. The apparatus of claim 1, further comprising an array of biaxial port micromirrors for maintaining optimum coupling efficiency into each port and maintaining optimum ITU grid alignment.

7. The apparatus of claim 6, wherein a combination of rotations of the port mirrors about one or both of their axes of rotation is chosen to minimize edge diffraction effects at an attenuated state.

8. The apparatus of claim 1, wherein the wavelength separator is a diffraction grating, wherein the grating is configured to filter out or reduce higher angular frequencies that contribute to an increase in signal intensity of a spectral channel near the side edges of a passband for that spectral channel relative to a central portion of the passband due to diffraction of that spectral channel from an edge of that spectral channel's associated micromirror, wherein the edge is substantially parallel to the attenuation axis and the signal is attenuated by rotating the channel micromirror about the attenuation axis.

9. The apparatus of claim 1, further comprising means for implementing hitless switching of the spectral channels.

10. A method of optimizing passband in optical apparatus for switching optical signals of a multi-channel optical signal having constituent spectral channels of different wavelengths between input and output ports, comprising:
spatially separating said multi-channel optical signal from one of the input ports into spectral beams corresponding to the constituent spectral channels; focusing the separated spectral channels onto corresponding channel micromirrors that switch the focused spectral channels to one or more selected output ports; and reducing an increase in signal intensity of a spectral channel near side edges of a passband for that spectral channel relative to a central portion of the passband due to diffraction of the corresponding spectral beam reflected from an edge of that spectral channel's associated micromirror, wherein the edge is substantially parallel to the attenuation axis and the signal is attenuated by rotating the channel micromirror about the attenuation axis.

11. The method of claim 10 wherein rotating one or more of the micromirrors partly about the attenuation axis and partly about a switching axis that is different from the attenuation axis includes rotating the mirror about the switching axis by an amount sufficient to produce about 2 dB or more of attenuation.

12. The method of claim 10 wherein rotating one or more of the micromirrors partly about the attenuation axis and partly about a switching axis that is different from the attenuation axis includes rotating the mirror about the switching axis by an amount sufficient to produce between about 2 dB of attenuation and about 4 dB of attenuation.

13. The method of claim 10 wherein reducing the increase in signal intensity of the spectral channel near the side edges of the passband for that spectral channel relative to a central portion of the passband due to effects of diffraction of the corresponding spectral beam for that spectral channel reflected from an edge of that spectral channel's associated micromirror includes rotating one or more of the micromirrors partly about the attenuation axis and partly about a switching axis that is different from the attenuation axis.

14. The method of claim 13, wherein reducing the increase in signal intensity of the spectral channel near the side edges of the passband for that spectral channel relative to a central portion of the passband includes attenuating the power level to an attenuation point through a combination of rotations of at least one micromirror about both the switching axis and the attenuation axis, wherein the combination of rotations includes sufficient rotation about the switching axis to reduce the increase in signal intensity of the spectral channel near the side edges of the passband.

15. The method of claim 14, further comprising dithering the at least one mirror with respect to an axis that is approximately tangent to a contour of constant attenuation by rotating the mirror simultaneously about the switching axis and the attenuation axis, wherein the contour of constant attenuation passes through the attenuation point.

16. The method of claim 10 wherein spatially separating said multi-channel optical signal into spectral beams corresponding to the constituent spectral channels includes converting the optical signals from the one or more input ports into spectral beams having a predetermined elongated beam profile by anamorphically expanding the beams in orthogonal directions; and spatially separating said spectral beams into constituent spectral channels.

17. The method of claim 10 wherein reducing the increase in signal intensity of the spectral channel near the side edges of the passband for that spectral channel relative to a central portion of the passband due to effects of diffraction of the corresponding spectral beam for that spectral channel reflected from an edge of that spectral channel's associated micromirror includes rotating one or more of the port mirrors partly about a first axis and/or partly about a second axis that is different from the first axis.

18. An apparatus for optimizing a passband in switching of a multi-channel optical signal having constituent spectral channels of different wavelengths between input and output ports, comprising:
means for spatially separating said multi-channel optical signal from one of the input ports into spectral beams corresponding to the constituent spectral channels;
means for focusing the separated spectral channels onto corresponding channel micromirrors that switch the focused spectral channels to one or more selected output ports; and
means for reducing an increase in signal intensity of a spectral channel near side edges of a passband for that spectral channel relative to a central portion of the passband due to diffraction of the spectral beam for that spectral channel reflected from an edge of that spectral channel's associated micromirror, wherein the edge is substantially parallel to the attenuation axis and the signal is attenuated by rotating the channel micromirror about the attenuation axis.

19. The apparatus of claim 18 wherein the means reducing non-uniform attenuation of the passband include means for rotating one or more of the micromirrors partly about the attenuation axis and partly about a switching axis that is different from the attenuation axis.

20. The apparatus of claim 19 wherein at least one channel micromirror attenuates the power level to an attenuation point through a combination of rotations about both the switching axis and the attenuation axis, wherein the combination of rotations includes sufficient rotation about the switching axis to reduce an increase in signal intensity near the side edges of a passband for that spectral channel relative to a central portion of the passband due to diffraction of the spectral beam corresponding to that spectral channel reflected from an edge of that spectral channel's associated micromirror, wherein the edge is substantially parallel to the attenuation axis and the signal is attenuated by rotating the channel micromirror about the attenuation axis.

21. The apparatus of claim 20, further comprising means for dithering the at least one mirror with respect to an axis that is substantially tangent to a contour of constant attenuation by rotating the mirror simultaneously about the switching axis and the attenuation axis, wherein the contour of constant attenuation passes through the attenuation point.

22. The apparatus of claim 20 wherein the combination of rotations includes sufficient rotation about the switching axis to produce 2 dB or more of attenuation.

23. The apparatus of claim 20 wherein the combination of rotations includes sufficient rotation about the switching axis to produce between about 2 dB and about 4 dB of attenuation.

* * * * *